(12) United States Patent
Hsiang

(10) Patent No.: US 8,126,054 B2
(45) Date of Patent: Feb. 28, 2012

(54) METHOD AND APPARATUS FOR HIGHLY SCALABLE INTRAFRAME VIDEO CODING

(75) Inventor: Shih-Ta Hsiang, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1053 days.

(21) Appl. No.: 11/971,354

(22) Filed: Jan. 9, 2008

(65) Prior Publication Data

US 2009/0175333 A1 Jul. 9, 2009

(51) Int. Cl.
*H04N 11/02* (2006.01)
(52) U.S. Cl. .......... 375/240.12; 375/240.18; 375/240.26
(58) Field of Classification Search ............. 375/240.12, 375/240.18, 240, 240.2
See application file for complete search history.

(56) References Cited

U.S. PATENT DOCUMENTS

| | | | |
|---|---|---|---|
| 2003/0099298 A1* | 5/2003 | Rose et al. | 375/240.27 |
| 2005/0195896 A1* | 9/2005 | Huang et al. | 375/240.03 |
| 2005/0226334 A1* | 10/2005 | Han | 375/240.16 |
| 2006/0083303 A1* | 4/2006 | Han et al. | 375/240.08 |
| 2006/0088101 A1* | 4/2006 | Han et al. | 375/240.16 |
| 2007/0098162 A1* | 5/2007 | Shin | 380/201 |
| 2007/0121723 A1* | 5/2007 | Mathew et al. | 375/240.12 |
| 2008/0131014 A1* | 6/2008 | Lee et al. | 382/251 |
| 2008/0291996 A1* | 11/2008 | Pateux et al. | 375/240.11 |
| 2009/0129467 A1* | 5/2009 | Li et al. | 375/240.12 |
| 2011/0110432 A1* | 5/2011 | Han et al. | 375/240.16 |

FOREIGN PATENT DOCUMENTS

| | | |
|---|---|---|
| WO | 2006043755 A1 | 4/2006 |
| WO | 2007077250 A2 | 7/2007 |
| WO | 2009042885 A8 | 4/2009 |

OTHER PUBLICATIONS

Intra-Fram Dyadic Spatial Scalable Coding Based on a Subband/Wavelet Framework for MPEG-4 A VC/H.264 Scalable Video Coding; Shih-Ta Hsiang; Arc-Multimedia Research Lab, Motorola Labs; Schaumburg, IL 60173, USA.
Wavelet-Based Embedded Rate Scalable Still Image Coders: A Review; Farag Ibrahim Younis Elnagahy, B. Simak; Czech Technical University in Prague; ACTA Polytechnica vol. 44 No. 1/2004; XP-002530060.
Advances in the Scalable Amendment of H.264/AVC; Hsiang Chun Huang, Wen-Hsiao Peng, and Tihao Chiang, National Chiao Tung University, Hsueh-Ming Hang, National Taipei University of Technology; IEEE Communications Magazine; Jan. 2007.
RU Official Action Translation for 2412-169822RU/9123, May 15, 2011, 3 pages.
LG Electronics, Inc.: "FPACH structure and coding for 1.28 Mcps TDD", 3GPP TSG-RAN WG1 Meeting #18, TSGR1#18(01)0123, Boston, USA, Jan. 15-18, 2001, all pages.
Hsiang, Shih-Ta: "SVC Intra-frame AVC/H.264 Sub-Band coding (SBC)", Joint Video Team (HVT) of ISO/IEC MPEG & ITU-T VCRG, JVT-X059, 24 th Meeting: Geneva, Jun. 29-Jul. 5, 2007, all pages.

* cited by examiner

*Primary Examiner* — Andrew Lee
(74) *Attorney, Agent, or Firm* — Gary J. Cunningham

(57) ABSTRACT

An apparatus and method is provided for highly scalable intraframe video coding. The conventional macroblock DCT tools are integrated with the subband filter banks for the improved efficiency of scalable compression. The enhancement layers are represented in a subband domain and coded by an inter-layer frame texture coder utilizing inter-layer prediction signal formed by the decoded previous layer. Each quality enhancement layer is additionally scalable in resolution.

19 Claims, 18 Drawing Sheets

2400

2405: GENERATING A BASE LAYER QUALITY BITSTREAM BY ENCODING THE SOURCE VIDEO FRAME AT A SPECIFIED LOWEST QUALITY LEVEL OR ENCODING BITRATE

2410: GENERATING A SET OF QUALITY ENHANCEMENT LAYER BITSTREAMS BY ENCODING THE SOURCE VIDEO FRAME AT A SET OF THE INCREASING QUALITY LEVELS OR ENCODING BITRATES, THE ENCODING INCLUDING

1) DECOMPOSING THE SOURCE VIDEO FRAME BY SUBBAND ANALYSIS FILTER BANKS INTO A SUBBAND REPRESENTATION OF THE SOURCE VIDEO FRAME

2) FORMING AN INTER-LAYER PREDICTION SIGNAL WHICH IS A REPRESENTATION OF A RECOVERED VIDEO FRAME OF THE NEXT LOWER QUALITY LAYER

3) GENERATING THE QUALITY ENHANCEMENT LAYER BITSTREAM BY ENCODING THE SUBBAND REPRESENTATION BY AN INTER-LAYER FRAME TEXTURE ENCODER THAT FURTHER UTILIZES THE INTER-LAYER PREDICTION SIGNAL TO REMOVE INTER LAYER REDUNDANCY

2415: COMPOSING A SCALABLE BITSTREAM FROM THE BASE QUALITY LAYER BITSTREAM AND THE SET OF QUALITY ENHANCEMENT LAYER BITSTREAMS USING A BITSTREAM MULTIPLEXER

2505 — EXTRACTING THE PACKETS CONTAINING THE RELATED CODED COEFFICIENTS TO A REQUESTED RESOLUTION AND/ OR QUALITY LEVEL FROM A SCALABLE BITSTREAM USING A BITSTREAM PARSER

2510 — RECOVERING A BASE QUALITY VERSION OF THE DECODED VIDEO FRAME FROM THE EXTRACTED PACKETS OF THE BASE QUALITY LAYER BITSTREAM

2515 — RECOVERING A SET OF DECODED SUBBAND REPRESENTATIONS OF INCREASING QUALITY LEVEL, WHEREIN EACH DECODED SUBBAND REPRESENTATION IN THE SET IS RECOVERED BY DECODING THE EXTRACTED PACKETS OF THE CORRESPONDING ONE OF THE SET OF ENHANCEMENT LAYER BITSTREAMS, COMPRISING FOR EACH ENHANCEMENT LAYER BITSTREAM

1) FORMING AN INTER-LAYER PREDICTION SIGNAL WHICH IS A REPRESENTATION OF A RECOVERED VIDEO FRAME OF THE NEXT LOWER QUALITY LAYER

2) RECOVERING THE SUBBAND REPRESENTATION BY DECODING THE EXTRACTED PACKETS OF THE CORRESPONDING ENHANCEMENT LAYER BY AN INTER-LAYER FRAME TEXTURE DECODER THAT FURTHER UTILIZES THE INTER-LAYER PREDICTION SIGNAL TO REMOVE INTER-LAYER REDUNDANCY

2520 — SYNTHESIZING THE DECODED VIDEO FRAME FROM THE DECODED SUBBAND REPRESENTATION AT THE FINAL ENHANCEMENT LAYER USING SUBBAND SYNTHESIS FILTER BANKS

2525 — PERFORMING A CLIPPING OPERATION ON THE SYNTHESIZED VIDEO FRAME ACCORDING TO THE PIXEL VALUE RANGE

*FIG. 25*

METHOD AND APPARATUS FOR HIGHLY SCALABLE INTRAFRAME VIDEO CODING

FIELD OF THE INVENTION

The present invention relates generally to video signal compression and more particularly to video signal compression for high definition video signals.

BACKGROUND

Intraframe video coding is useful for applications that require fast random access to individual video frames. The example areas of application include motion picture production, medical and satellite imaging, and digital cinema. Recently, the Joint Video Team (JVT) of the ITU-T Video Coding Experts Group (VCEG) and ISO/IEC Moving Picture Expert Group (MPEG) released a scalable video coding (SVC) extension to the H.264/AVC standard to address the increasing need for more flexible video representation for video services over heterogeneous environments. SVC provides a new profile dedicated to intraframe video coding which, known as Scalable High Intra, is mainly targeted for professional applications.

Prior international video coding standards such as MPEG-1, 2, 4 and H.26x family were based on a hybrid coding framework, a hybrid of differential pulse code modulation (DPCM) and discrete cosine transform (DCT) coding. This DPCM framework was naturally extended for scalable video coding by further integrating the inter-layer prediction signal for DPCM coding at the enhancement layer, as found in the former scalable video coding standards MPEG-2, MPEG-4, H.263+, and the recent SVC standard. This method adds each enhancement layer to the accumulated previous bitstream layers to further enhance the coded video. The improvement can be made to refine video quality, spatial resolution, or video frame-rate, corresponding to quality/SNR, spatial and temporal scalability, respectively. The resulting scalable video coding system has some typical problems associated with a conventional DPCM coding system such as error propagation and "drift", which is caused by the different versions of prediction signals employed at the encoder and decoder. It also often incurs a significant efficiency and complexity penalty for accommodating scalable video compression.

For intraframe spatial scalable coding, specifically, those former standards have adopted a pyramid coding approach for providing a multi-resolutional signal representation. This method utilizes the interpolated frame from the recovered base-layer video to predict the related high resolution frame at the enhancement layer and the resulting residual signal is coded by the enhancement layer bitstream. It is illustrated in FIG. 2, which is a diagram that uses representations of the coded intra-frame layers to illustrate their relationship for a video frame that has been scalably coded with three resolution levels, in accordance with prior art practices. However, the number of resulting source pixel samples is thus increased by 33.3% for building a complete image pyramidal representation in the resulting coding system, which can inherently further reduce compression efficiency. The simulation results from the JVT core experiment also show that the current H.264/AVC joint scalable video model (JSVM) suffers from substantial efficiency loss for intra dyadic spatial scalable coding, particularly toward the high bitrate range.

In recent years, subband/wavelet coding has been demonstrated to be one of the most efficient methods for image coding in the literature. It has also been utilized in the international standard JPEG 2000 for image and video (in the format of Motion JPEG 2000) coding applications in industry. Thanks to high energy compaction of subband/wavelet transform, these state-of-the-art coders are capable of achieving excellent compression performance without traditional blocky artifacts associated with the block transform. More importantly, they can easily accommodate the desirable spatial scalable coding functionality with almost no penalty in compression efficiency because the subband/wavelet decomposition is resolution scalable by nature. FIG. 1 is a diagram that uses representations of the coded subbands to illustrate their relationship for an image that has been subband coded with three resolution levels, n=0, n=1, and n=2, in accordance with prior art practices. Higher resolution levels such as n=2 are synthesized from three subbands (commonly designate HL, LH, HH) at the higher level, plus the subbands from all the next lower levels, with an understanding that the "subband" of the lowest level is a base layer that provides a low resolution version of the image. However, because the subband/wavelet analysis lowpass filter is not a perfect half band filter, the aliasing artifacts are introduced in the resulting low-resolution video, which produces a disturbing flicker to the human visual system for video coding application.

A new intraframe scalable coding framework based on a subband/wavelet coding approach is presented herein. In the proposed framework, the employed down-sampling filter for generating low resolution video at the base layer is not particularly tied to the specific subband/wavelet filter selection for signal representation, in contrast to the traditional wavelet coding system in FIG. 1. In addition, research efforts have been aimed at efficiently exploiting the subband/wavelet techniques within the traditional macroblock and DCT based video coding system, for improved efficiency of intraframe scalable coding. Unlike the former MPEG-4 visual texture coding (VTC), which is essentially built upon a separate zero-tree based system for coding wavelet coefficients, the proposed subband coding framework is particularly adapted for being integrated with the H.264/AVC JSVM reference software, with minimal modifications to the current standard. As such, the modified H.264/AVC coding system can take advantage of the benefits of wavelet coding with minimal increase in implementation complexity.

As demonstrated by simulation results herein, the intraframe quality scalable coding of the current SVC, based on the conventional layered DPCM approach, also suffers from substantial performance loss in comparison with single-layer coding. The nature of such loss is like that of the conventional inter-video SNR scalable coding methods, where coding efficiency is reduced because the coarsely coded base layer signal is utilized for signal prediction and leads to a residual signal with high energy. The proposed subband coding system detailed herein can be further extended for quality scalable coding applications with improved coding performance based on a transform coding approach. Each quality enhancement layer in the proposed system is additionally scalable in resolution, thus providing a very flexible bitstream for scalable decoding under a wide variety of quality and resolution constraints. As such, the efficient and highly scalable wavelet image/video compression, as demonstrated by JPEG2000, can be additionally accommodated by a slightly modified standard coding system, with low extra implementation costs. Image and video coding applications, traditionally serviced by separate coders, can be efficiently provided by an integrated coding system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 24 is a flow chart that shows some steps of a quality scalable video encoding method for compressing a source video frame, in accordance with certain embodiments.

FIG. 25 is a flow chart that shows some steps of a quality scalable video decoding method for decompressing a coded video frame, in accordance with certain embodiments.

Figure 1:
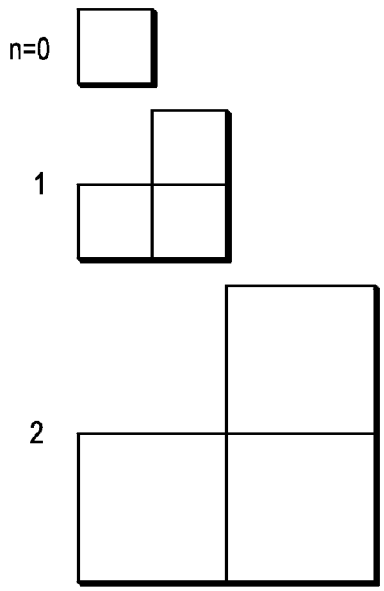
FIG. 1 illustrates the signal representation of a coded image or video frame using a subband/wavelet coding approach with three resolution levels in accordance with prior art practices.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail the following embodiments, it should be observed that the embodiments reside primarily in combinations of method steps and apparatus components related to intra-frame spatial and scalable video encoding. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

A. Spatial Scalable Coding

Figure 3:
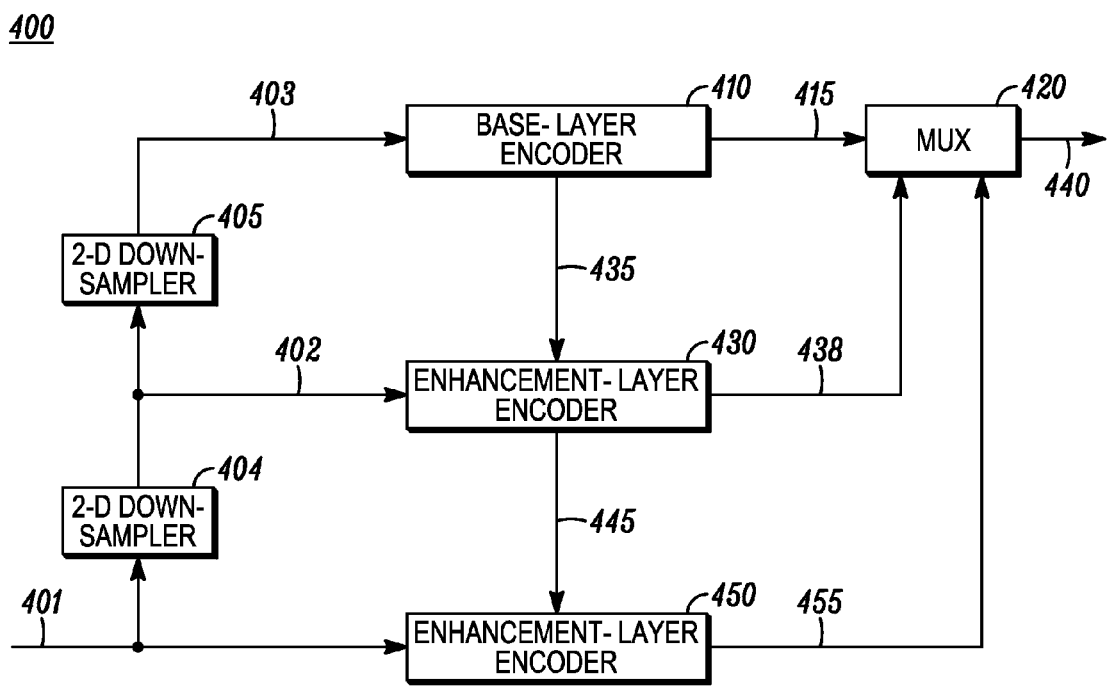
FIG. 3 shows a high level block diagram of a general spatial scalable encoding system with three resolution scalable layers.

Referring to FIG. 3, a high level block diagram is presented that shows a spatial scalable encoding system 400 for conventional systems and for certain embodiments having three layers of resolution, which is used to provide an introduction to the general spatial scalable encoding system architecture. A video frame signal 401 for a highest resolution version of a video frame is coupled to two dimensional (2-D) down sampler 404 and to an enhancement layer encoder 450. The 2-D down sampler generates a down sampled version 402 of the video frame that is coupled to a 2 dimensional down sampler 405 and to an enhancement layer encoder 430. The 2 dimensional down sampler 405, which may be different from the 2 dimensional down sampler 404, generates a lowest resolution version of the video frame that is coupled to a base layer encoder 410. The base layer encoder 410 generates a base layer bitstream 415 as an output that is coupled to a multiplexer 420. The enhancement layer encoder 430 uses recovered information 435 from the base layer for removing inter-layer redundancies and generates an enhancement layer bitstream 438 as an output for representing the coded input video frame 402. The enhancement layer bitstream 438 is also coupled to the multiplexer 420. The enhancement layer encoder 450 uses recovered information 445 from the next lower layer for removing interlayer redundancies and generates an enhancement layer bitstream 455 as an output for representing the coded input video frame 401. The enhancement layer bitstream 455 is also coupled to the multiplexer 420. The multiplexer 420 multiplexes the base layer bitstream and the two enhancement layer bitstreams 438, 455 to generate a scalable bitstream 440 that conveys the encoded information needed to recover either a low resolution version of the video frame, a higher resolution version of the video frame, or a highest resolution version of the bitstream.

Figure 4:
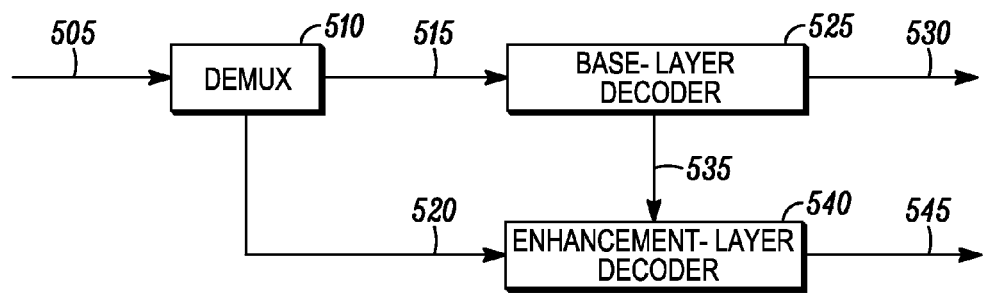
FIG. 4 shows a high level block diagram of a general spatial scalable decoding system with two resolution scalable layers.

Referring to FIG. 4, a high level block diagram is presented that shows a spatial scalable decoding system 500 for conventional systems and for certain embodiments having two layers of resolution, which is used to provide an introduction to the general spatial scalable decoding system architecture. It will be appreciated that this high level block diagram closely mirrors the high level block diagram of the encoder 400. A demultiplexer 510 demultiplexes a received version 505 of the scalable bitstream 440 into a received base layer bitstream 515 and a received enhancement layer bitstream 520. A base layer decoder 525 decodes the received base layer bitstream 515 and generates a recovered low resolution version 530 of the original video frame. An enhancement layer decoder 540 decodes the received enhancement layer bitstream 520 and further uses recovered information 535 from the base layer to generate a recovered high resolution version 545 of the coded video frame. It should be apparent to one of ordinary skill in the art how the high level block diagram for an embodiment having three layers of resolution would be constructed.

Figure 5:
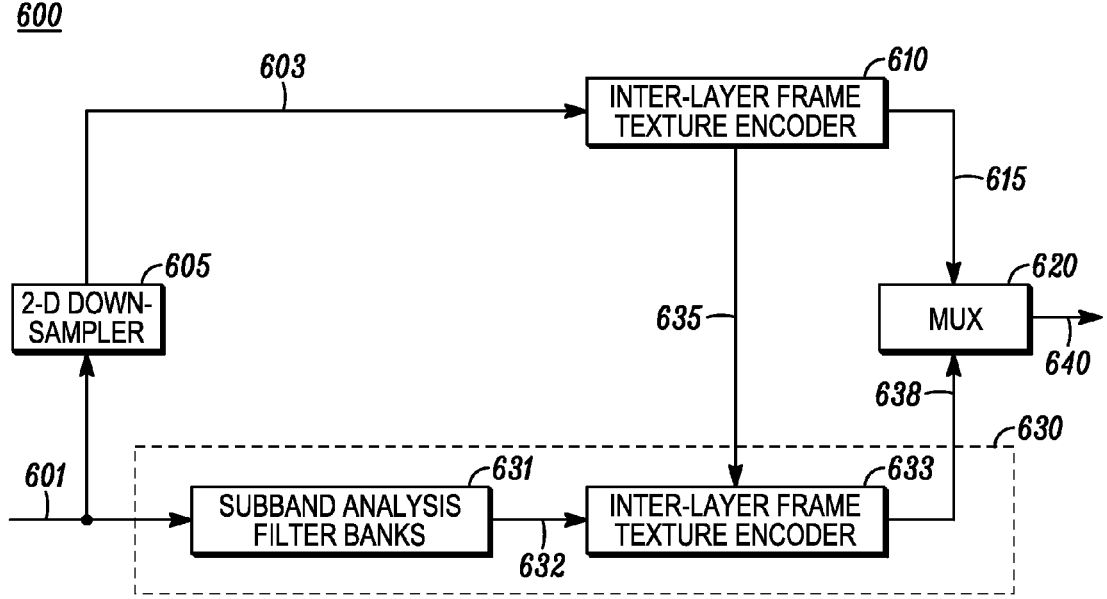
FIG. 5 shows a block diagram of the proposed spatial scalable encoding system for certain embodiments having two layers of resolution, in accordance with certain embodiments.

Referring to FIG. 5, a block diagram shows a spatial scalable encoding system 600 for certain of the proposed embodiments having two layers of resolution. A video frame signal 601 for a highest resolution version of a video frame is coupled to a two dimensional (2-D) down sampler 605 and to subband analysis filter banks 631 of an enhancement layer encoder 630. The 2-D down sampler 605 generates a lowest resolution version 603 of the source video frame. The lowest resolution version 603 is coupled to a base layer encoder that comprises an intra-layer frame texture encoder 610. The intra-layer frame texture encoder 610 generates a base layer bitstream 615 as an output that is coupled to a multiplexer 620. The subband analysis filter banks 631 generate subband (wavelet) coefficients of the highest resolution version 601 of the video frame—these are usually the subbands referred in the art as the LL, LH, HL, and HH subbands. The inter-layer frame texture encoder 633 utilizes information 635 from the base layer for removing interlayer redundancies and generates an enhancement layer bitstream 438 as an output for representing the coded input subband representation 632. The enhancement layer bitstream 438 is also coupled to the multiplexer 620. The multiplexer 620 multiplexes the base layer bitstream 615 and the enhancement layer bitstream 438 to generate a scalable bitstream 640 that conveys the encoded information needed to recover either a low resolution version of the video frame or a highest resolution version of the bitstream. It will be appreciated that in an embodiment having more enhancement layers, the subband analysis filter banks of each enhancement layer encoder are applied to generate a subband representation for a particular resolution version of a source video frame and the resulting subband coefficients of the representations are encoded by the inter-layer texture frame encoder at each enhancement layer.

Figure 6:
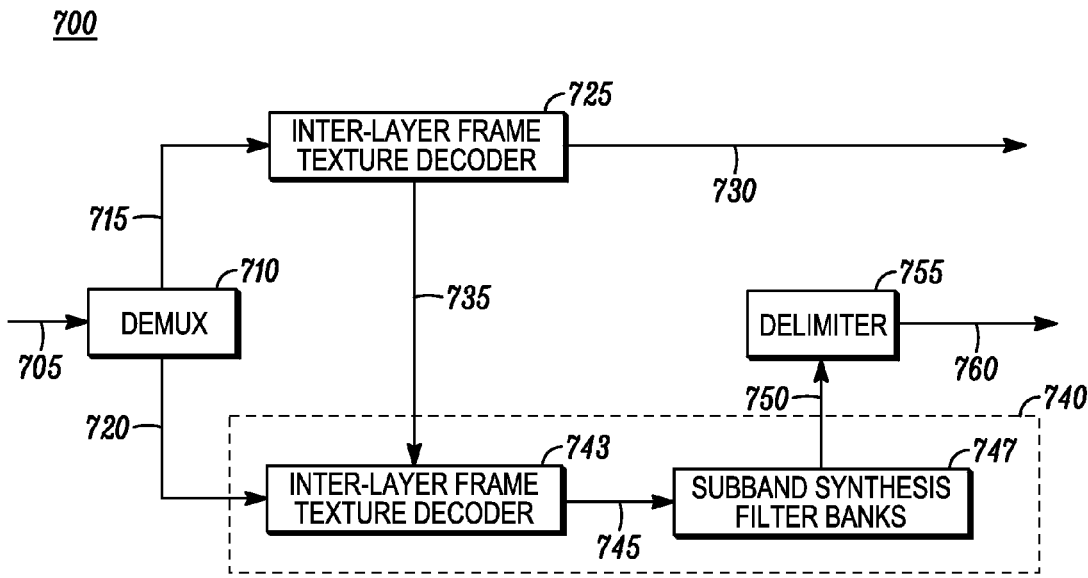
FIG. 6 shows a block diagram of the proposed spatial scalable decoding system for certain embodiments having two layers of resolution.

Referring to FIG. 6, a block diagram shows a spatial scalable decoding system 700 for certain embodiments having two layers of resolution. It will be appreciated that this block diagram closely mirrors the block diagram of the encoder 600. A demultiplexer 710 demultiplexes a received version 705 of the scalable bitstream 440 into a received base layer bitstream 715 and a received enhancement layer bitstream 720. The received base layer bitstream 715 is decoded by a base layer decoder that comprises an intra-layer frame texture decoder 725 and generates a recovered low resolution version 730 of the coded video frame. The inter-layer frame texture decoder 743 decodes the received enhancement layer bitstream 720 and further uses recovered information 735 from the base layer to generate a recovered subband representation 745 of the enhancement layer. Subband synthesis filters banks 747 then process the recovered subband representation 745 and generate a synthesized high resolution version 750 of the coded video frame. The synthesized high resolution version 750 of the coded video frame is finally coupled to a delimiter 755 that performs a clipping operation on the synthesized frame according to the pixel value range. It should be apparent to one of ordinary skill in the art how the lower level block diagram for an embodiment having three or more layers of resolution would be constructed.

Figure 7:
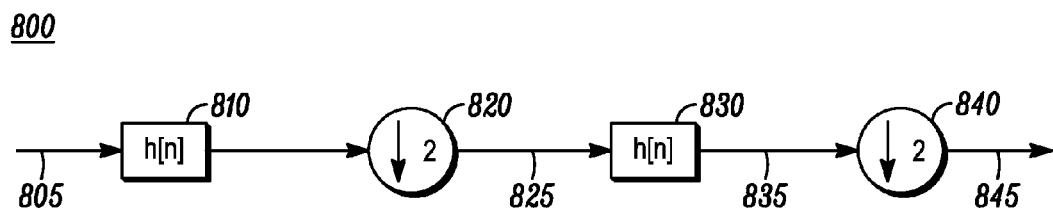
FIG. 7 shows a block diagram for 2-D down sampling operation, in accordance with certain 2-D separable dyadic embodiments.

Referring to FIG. 7, a block diagram illustrates the down sampling operation performed by the 2-D down-sampler 404, 405, and 605, in accordance with certain 2-D separable dyadic embodiments. The video frame information 810 (also referred to more simply as the video frame) is accepted as an input by a first one dimensional (1-D) filter 810 which performs vertical filtering on the individual columns of the input video frame and the filtered frame is then further down sampled vertically by a factor of 2. This result 825 is next processed by a second 1-D filter 830 which performs horizontal filtering on the individual rows of the input signal 825 and the filtered signal is then further down sampled horizontally by a factor of 2, creating a low resolution version of the input frame 845 with down scaled size by a factor of 2 in each spatial dimension. Typically, the same 1-D low-pass filter is employed by both filters 810 and 830. In certain embodiments, the down sampling operation as just described is used to create the versions of the source video frame other than the version of the source video frame having the highest resolution by starting with the highest resolution version of the source video frame and recursively creating each next lower resolution source video frame from a current version by performing a cascaded two-dimensional (2-D) separable filtering and down-sampling operation that uses a one-dimensional lowpass filter associated with each version. In certain embodiments, each lowpass filter may be one of an MPEG-2 decimation filter for 2-D separable filtering with the filter coefficients (−29, 0, 88, 138, 88, 0, −29)/256, an MPEG-4 decimation filter with the filter coefficients (2, 0, −4, −3, 5, 19, 26, 19, 5, −3, −4, 0, 2)/64, as described in versions of the named documents on or before 20 Oct. 2006. In certain alternative embodiments, each lowpass filter is a low pass filter of the subband analysis filter banks with the values of filter coefficients further scaled by a scaling factor. In these embodiments, the low pass filter used to generate the lowest resolution version of the video frame may be different from layer to layer and may be done directly from the highest resolution version of the video frame. This unique feature provides the flexibility for down-sampler design to create optimal low resolution versions of the video frame.

Figure 8:
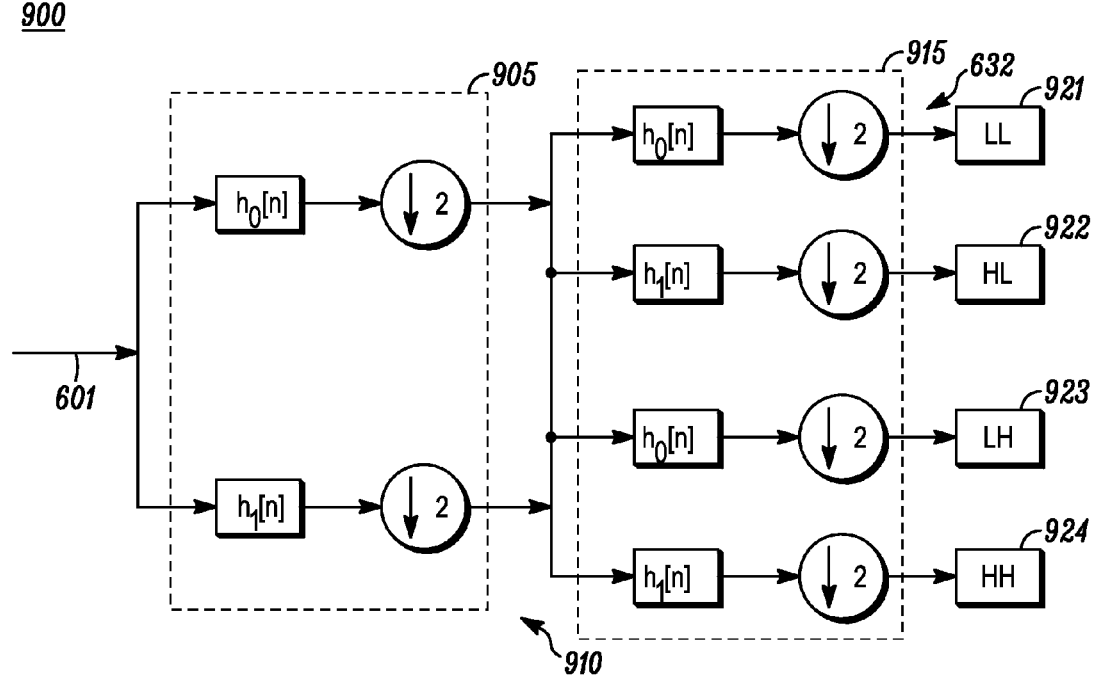
FIG. 8 is a block diagram that illustrates certain subband analysis filter banks, in accordance with certain 2-D separable dyadic embodiments.
Figure 9:
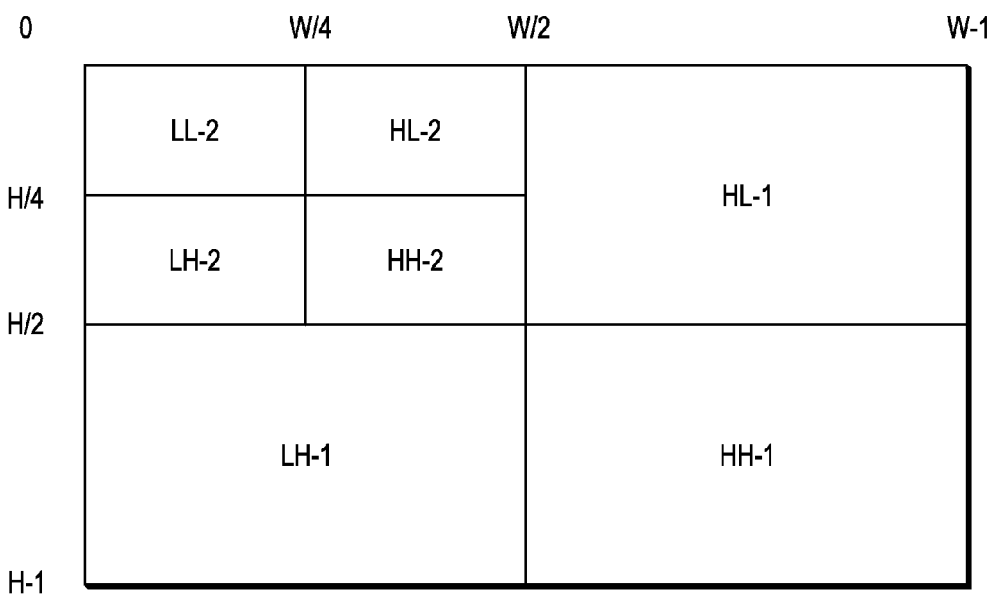
FIG. 9 illustrates the subband partition for a decomposed frame after two levels of the dyadic subband decomposition, in accordance with certain embodiments.

Referring to FIG. 8, a block diagram illustrates the subband analysis filter banks 631 (FIG. 5), in accordance with certain 2-D separable dyadic embodiments. An input video frame is first respectively processed by a lowpass filter and a highpass filter followed by a down sampling operation along the vertical direction, generating intermediate signals 910. The intermediate signals 910 are then respectively processed by a lowpass filter and a highpass filter followed by a down sampling operation along the horizontal direction, generating the four subbands (LL 921, HL 922, LH 923, and HH 924) for the version of the video frame at the particular resolution. This process is commonly referred to as wavelet/subband decomposition. The subband synthesis filter banks are a mirror version of the corresponding subband analysis filter banks. The filters used in the subband analysis/synthesis filter banks may belong to a family of wavelet filters or a family of QMF filters. For a system that has a plurality of levels of resolution, each set of subbands for representing the current resolution level can be synthesized to form the LL subband of the next higher level of resolution. This aspect is illustrated by FIG. 9, in which the subbands of the highest resolution layer are indicated by the suffix −1, and in which the base or lowest layer is LL-2. H and W stand for, respectively, for height and width of the full resolution video frame.

Figure 10:
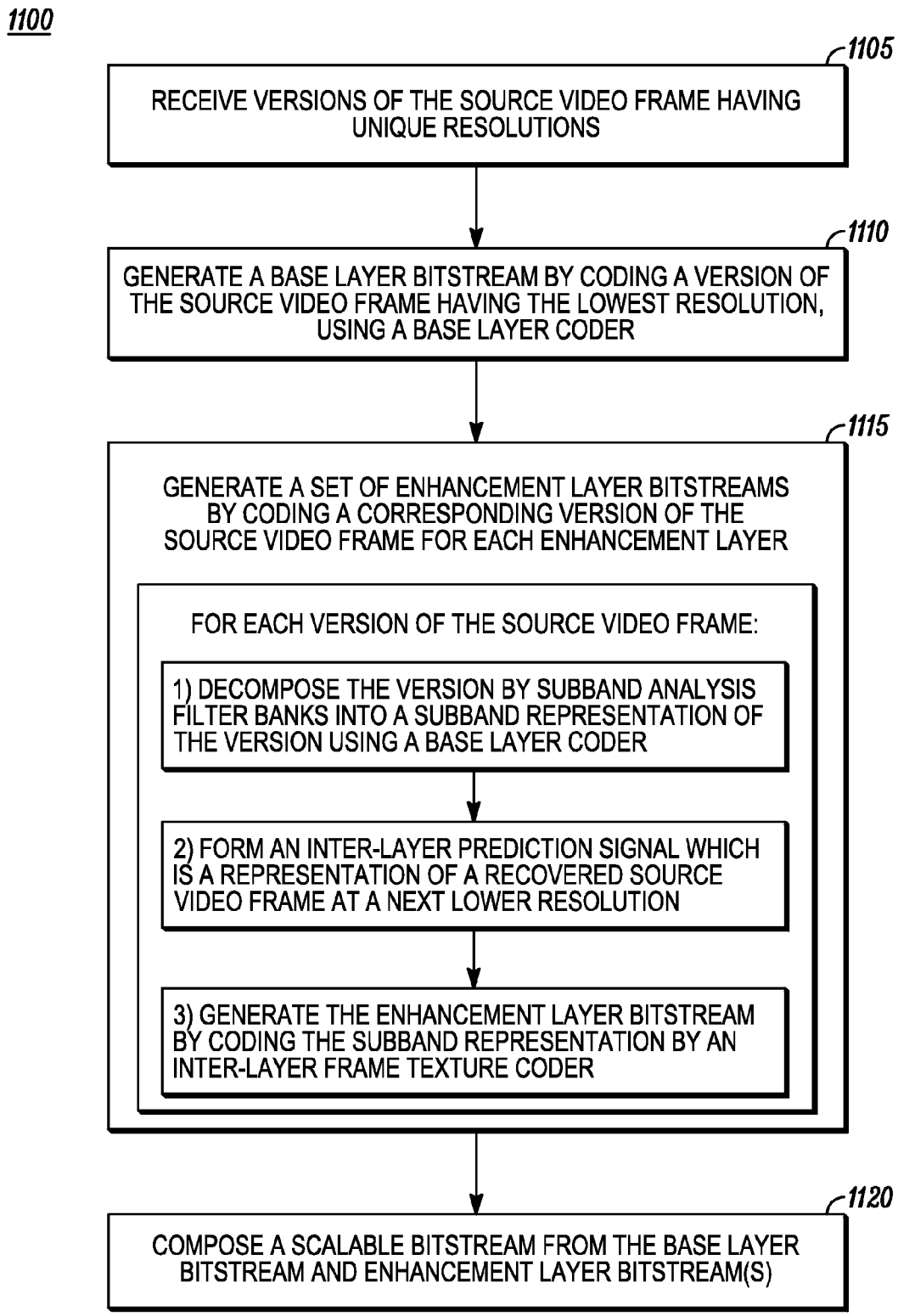
FIG. 10 is a flow chart that shows some steps of a spatial scalable video encoding method for compressing a source video frame, in accordance with certain embodiments.

Referring to FIG. 10, a flow chart 1100 shows some steps of a spatial scalable video encoding method for compressing a source video frame, in accordance with certain embodiments, based at least in part on the descriptions above with reference to FIGS. 3-9. The method 1100 is generalized for a video frame that uses any number of versions of the video frame, wherein each version has a unique resolution. At step 1105, versions of a source video frame are received, in which each version has a unique resolution. A base layer bitstream is generated at step 1110 by encoding a version of the source video frame having the lowest resolution, using a base layer encoder. A set of enhancement layer bitstreams is generated at step 1115, in which each enhancement layer bitstream in the set is generated by encoding a corresponding one of the versions of the source video frame. There may be as few as one enhancement layer bitstream in the set. For each version of the source video frame, the encoding comprises 1) decomposing the corresponding one of the versions of the source video frame by subband analysis filter banks into a subband representation of the corresponding one of the versions of the source video frame, 2) forming an inter-layer prediction signal which is a representation of a recovered source video frame at a next lower resolution; and 3) generating the enhancement layer bitstream by encoding the subband representation by an inter-layer frame texture encoder that uses the inter-layer prediction signal. A scalable bitstream is composed at step 1120 from the base layer bitstream and the set of enhancement layer bitstreams using a bitstream multiplexer.

Figure 11:
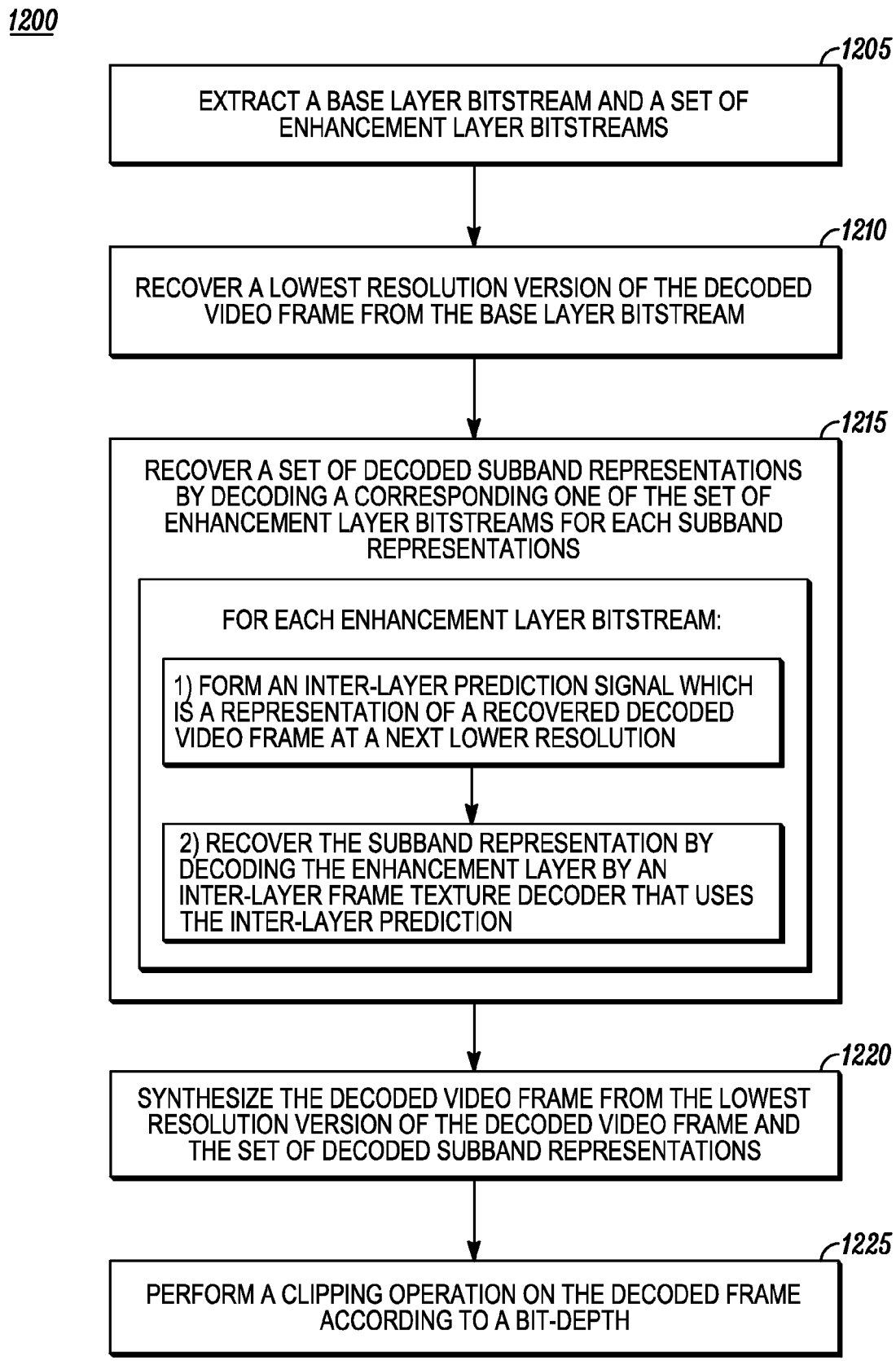
FIG. 11 is a flow chart that shows some steps of a spatial scalable video decoding method for decompressing a coded video frame, in accordance with certain embodiments.

Referring to FIG. 11, a flow chart 1200 shows some steps of a spatial scalable video decoding method for decompressing a coded video frame into a decoded video frame, in accordance with certain embodiments, based at least in part on the descriptions above with reference to FIGS. 3-9. At step 1205, a base layer bitstream and a set of enhancement layer bitstreams are extracted using a bitstream de-multiplexer. At step 1210, a lowest resolution version of the decoded video frame is recovered from the base layer bitstream using a base layer decoder. At step 1215, a set of decoded subband representations is recovered. Each decoded subband representation in the set is recovered by decoding a corresponding one of the set of enhancement layer bitstreams. For each enhancement layer bitstream, the decoding comprises 1) forming an inter-layer prediction signal which is a representation of a recovered decoded video frame at a next lower resolution, and 2) recovering the subband representation by decoding the enhancement layer by an inter-layer frame texture decoder that uses the inter-layer prediction signal. The decoded video frame is synthesized from the lowest resolution version of the decoded video frame and the set of decoded subband representations using subband synthesis filter banks. At step 1225, a clipping operation may be performed on the decoded frame according to the pixel value range adopted for the pixel representation.

It will be appreciated that, while the methods 1100 and 1200 are described in terms of encoding and decoding a video frame, the same methods apply to encoding and decoding an image that is not part of a video sequence.

Figure 12:
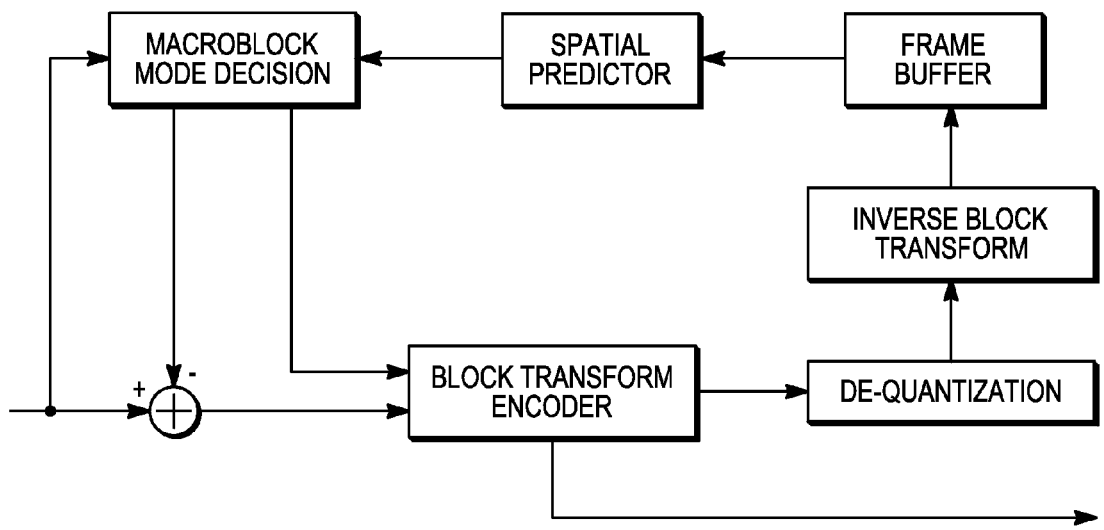
FIG. 12 is a block diagram of an intra-layer frame texture encoder, in accordance with certain embodiments.

The base layer video 603 in the proposed spatial scalable encoding system 600 can be encoded by a conventional single layer intra-frame video encoder, wherein each video frame is encoded by a conventional intra-layer frame texture encoder. Referring to FIG. 12, a block diagram of an intra-layer frame texture encoder 1300 is shown, in accordance with certain embodiments. The intra-layer frame texture encoder 1300 is an example that could be used for the intra-layer frame texture encoder 610 (FIG. 5) in the spatial scalable encoding system 600 (FIG. 5). The intra-layer frame texture encoder 1300 comprises conventional functional blocks that are inter-coupled in a conventional manner, and in particular uses a conventional block transform encoder 1310 to perform macroblock encoding of an input signal 1305 to generate an output signal 1315 and an inter-layer prediction signal 1320. When the input signal is a lowest resolution version of the source video frame, as it is in the embodiment of FIG. 5, the output signal is an encoded base layer bitstream.

Figure 13:
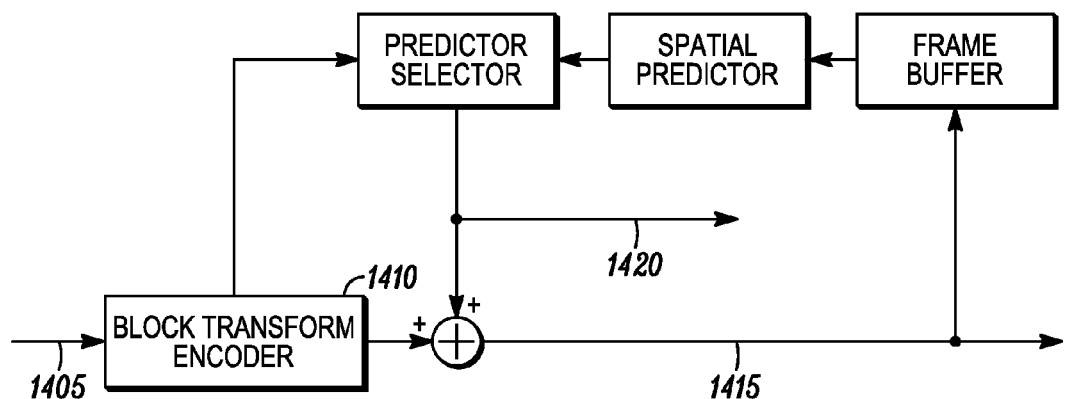
FIG. 13 is a block diagram of an intra-layer frame texture decoder, in accordance with certain embodiments.

Referring to FIG. 13, a block diagram of an intra-layer frame texture decoder 1400 is shown, in accordance with certain embodiments. The intra-layer frame texture decoder 1400 is an example that could be used for the intra-layer frame texture decoder 725 (FIG. 6) in the spatial scalable decoding system 700 (FIG. 6). The intra-layer frame texture decoder 1400 comprises conventional functional blocks that are inter-coupled in a conventional manner, and in particular uses a conventional block transform decoder 1410 to perform macroblock decoding of an input signal 1405 to generate an output signal 1415

It is a desirable feature that the base layer bitstream from a scalable coding system is compatible with a non-scalable bitstream from a conventional single layer coding system. In certain embodiments, the intra-layer frame texture decoder 1400 is an intra-frame decoder described in the versions of the standards MPEG-1, MPEG-2, MPEG-4, H.261, H.263, MPEG-4 AVC/H.264 and JPEG as published on or before 20 Oct. 2006).

Various methods for compressing subband/wavelet coefficients of a transformed image have been presented in the literature. For example, a zero-tree based algorithm is utilized by the MPEG-4 wavelet visual texture coding (VTC) tool (as published on or before 20 Oct. 2006). JPEG2000 adopted the EBCOT algorithm (the version published on or before 20 Oct. 2006) which is a multi-pass context-adaptive coding scheme for encoding individual wavelet coefficient bit-planes. A unique and beneficial aspect of our certain embodiments is to effectively exploit the conventional video tools for efficient implementation of the proposed subband/wavelet scalable coding system. Particularly, the DCT macroblock coding tools designed for coding pixel samples in the current video coding standards are employed to encode subband/wavelet coefficients in these embodiments. In this way, the proposed scalable coding techniques can be implemented with low cost by most re-use of the existing video tools.

Figure 14:
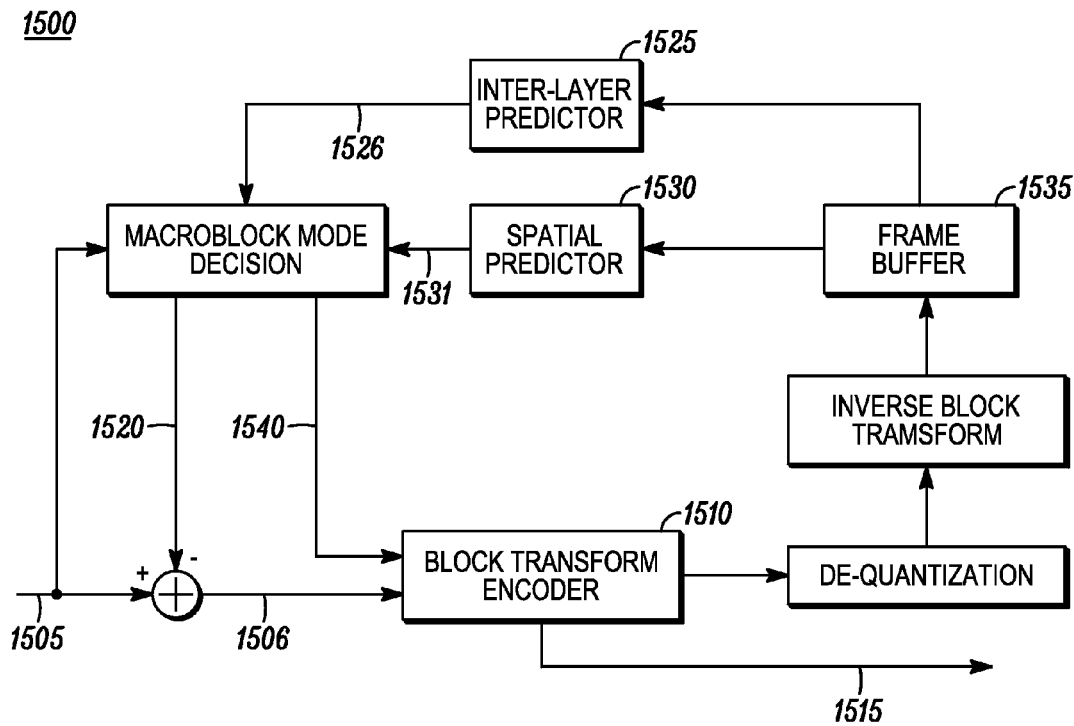
FIG. 14 is a block diagram of an inter-layer frame texture encoder, in accordance with certain embodiments.
Figure 15:
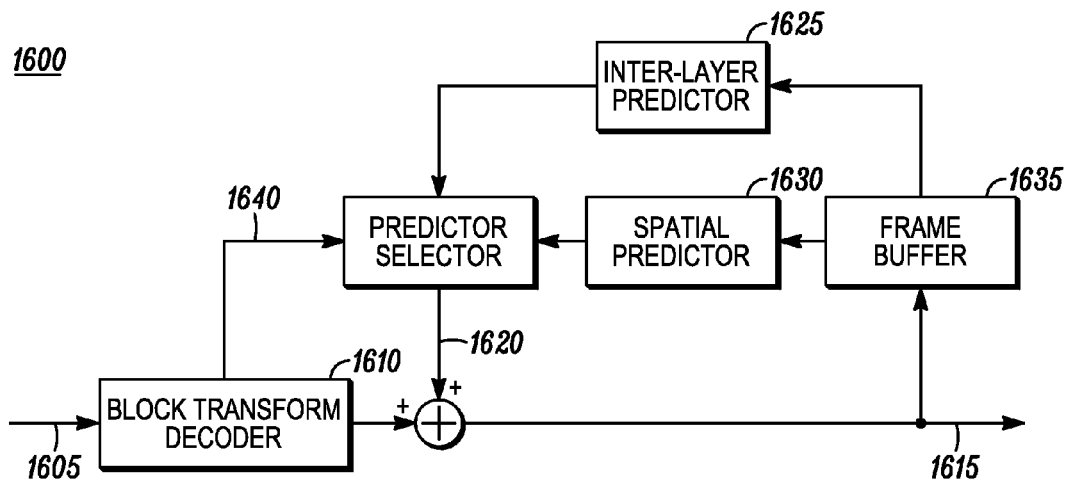
FIG. 15 is a block diagram of an inter-layer frame texture decoder, in accordance with certain embodiments.

Referring to FIG. 14, a block diagram of an inter-layer frame texture encoder 1500 is shown, in accordance with certain embodiments. The inter-layer frame texture encoder 1500 is an example that could be used for encoding an enhancement layer frame in a conventional scalable video encoding system. It is used as the inter-layer frame texture encoder 633 (FIG. 5) for encoding an enhancement layer subband decomposed frame in certain embodiments of the proposed spatial scalable encoding system 600 (FIG. 5). The inter-layer frame texture encoder 1500 comprises conventional functional blocks—in particular a conventional block transform encoder 1510—to perform macroblock encoding of an input signal 1505 to generate an output signal 1515. The input signal 1505 is typically a subband representation of a version of the source frame having a resolution other than the lowest resolution, such as the subband representation 632 of the full resolution signal 601 in the spatial scalable encoding system 600. The subband representation is sequentially partitioned into a plurality of block subband representations for non-overlapped blocks, further comprising encoding the block subband representation for each non-overlapped block by the inter-layer frame texture encoder. The blocks may be those blocks commonly referred to as macroblocks. The output signal 1515 is an enhancement layer bitstream comprising block encoded prediction error of the subband representation 632 and 1505. The block encoded prediction error may be formed by block encoding a difference of the subband representation at the input 1505 to the inter-layer frame texture encoder 1500 and a prediction signal 1520 that is selected from one of an inter-layer predictor 1525 and a spatial predictor 1530 on a block by block basis, using a frame buffer 1535 to store a frame that is being reconstructed during the encoding process on a block basis. The type of prediction signal that has been selected for each block is indicated by a mode identifier 1540 in a syntax element of the bitstream 1515. In certain of these embodiments, the inter-layer prediction signal 1526 is set to zero for the highest frequency subbands Referring to FIG. 15, a block diagram of an inter-layer frame texture decoder 1600 is shown, in accordance with certain embodiments. The inter-layer frame texture decoder 1600 is an example that could be used for the inter-layer frame texture decoder 743 (FIG. 6) in the spatial scalable decoding system 700 (FIG. 6). The inter-layer frame texture decoder 1600 comprises conventional functional blocks—in particular a conventional block transform decoder 1610—to perform macroblock decoding of an input signal 1605 to generate an output signal 1615. The input signal 1605 is typically an enhancement layer bitstream 1515 as described above with reference to FIG. 14. The bitstream is applied to a block transform decoder 1610, which generates block decoded prediction error of the subband representation. The blocks may be those blocks commonly referred to as macroblocks. Using a mode indication 1640 obtained form a syntax element of the bitstream, the inter-layer frame texture decoder 1600 adaptively generating a prediction signal 1620 of the subband representation on a block by block basis by one of an inter-layer predictor 1625 and a spatial predictor 1630. The prediction signal is added to the subband prediction error on a block basis to generate a decoded subband representation of a version of the source frame having a resolution other than the lowest resolution. In certain of these embodiments, the inter-layer prediction signal is set to zero for the highest frequency subbands In certain of these embodiments, the inter-layer frame texture encoder 1600 comprises an enhancement layer intra-frame decoder described in one of the standards MPEG-2, MPEG-4, the version.2 of H.263, and Amendment 3 (Scalable Video Extension) of the MPEG-4 Part 10 AVC/H.264 but without the clipping operation performed on the decoded signal in the intra-frame encoder. In certain of these embodiments, the set of enhancement layer bitstreams is compatible with Amendment 3 (Scalable Video Extension) of the MPEG-4 Part 10 AVC/H.264 standard.

Figure 16:
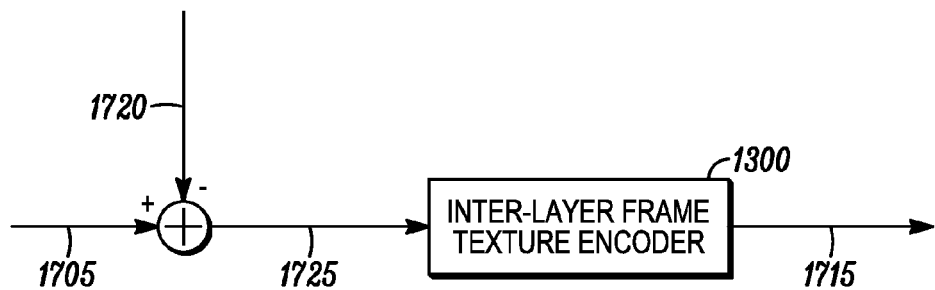
FIG. 16 is a block diagram of another inter-layer frame texture encoder, in accordance with certain embodiments.

Referring to FIG. 16, a block diagram shows another inter-layer frame texture encoder 1700, in accordance with certain embodiments. In comparison to the inter-layer frame texture encoder 1500, the intra-layer frame texture encoder 1300 (FIG. 12), which is more widely available for conventional video coding applications, is utilized to build an inter-layer frame texture encoder. In these embodiments, the intra-layer frame texture encoder 1300 encodes a residual (prediction error) signal 1725 that is a difference between the subband representation 1705 and the inter-layer prediction signal 1720 to generate an output bitstream 1715

Figure 17:
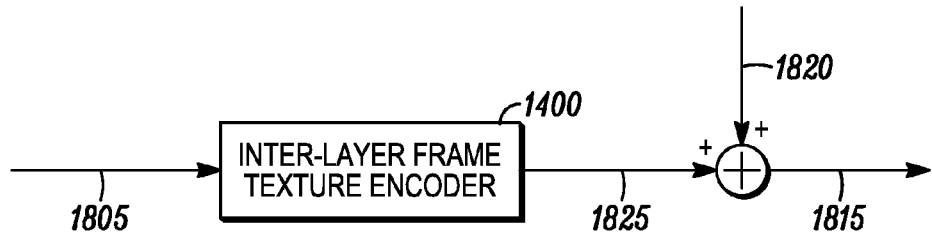
FIG. 17 is a block diagram of another inter-layer frame texture decoder, in accordance with certain embodiments.

Referring to FIG. 17, a block diagram shows an inter-layer frame texture decoder 1800, in accordance with certain embodiments. The inter-layer frame texture decoder 1800 has an architecture that mirrors inter-layer frame texture encoder 1700. The inter-layer texture decoder 1800 comprises an intra-layer texture decoder 1400 (FIG. 13) that generates a residual signal 1825 (prediction error) from an enhancement layer 1805 and the subband representation 1815 is generated by adding the inter-layer prediction signal 1820 to the residual signal 1825.

In certain embodiments, the enhancement layer bitstreams contain a syntax element indicating the number of the subband decomposition levels for representing an enhancement layer video frame. In this way the number of the subband levels can be individually optimized for each enhancement layer frame for best coding performance.

Figure 18:
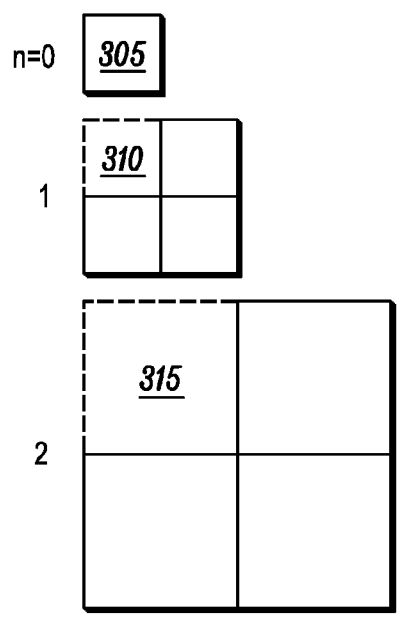
FIG. 18 illustrates the signal representation of a coded image or video frame using the proposed new subband/wavelet coding approach with three resolution levels, in accordance with certain embodiments.

Referring to FIG. 18, a diagram uses representations of coded layers to illustrate their relationship for an example of a video frame that has been encoded with three spatial scalable layers, n=0, n=1, and n=2, in accordance with certain of the proposed embodiments. When the normalized subband low-pass analysis filter is adopted as the lowpass filter 800 (FIG. 7) for image down-sampling at the base layer as well as for the analysis filters in the analysis filter banks 900, the scaled versions of the output signals (921 FIG. 8 and 846 FIG. 7) are substantially the same and the lowpass residual signal 1506 (FIG. 14) is reduced to a quantization error. We can then simply skip the texture coding of the residual signal over the lowpass subband region LL 310, 315 in FIG. 18 if the average scaled distortion from the next lower layers (the two lower layers in the example of FIG. 18) is near or below the optimal distortion level for the assigned bitrate or quantization parameters at the current enhancement layer. The critical sampling feature of subband/wavelet coding is thus retained for achieving best compression efficiency and reduced complexity overhead. Nevertheless, unlike the conventional subband/wavelet image coding system, the proposed intra-frame scalable coding embodiment, similar to pyramidal coding, still possesses the freedom for designing the optimal down sampling filter at the encoder to generate the desirable source video of the reduced resolution for target applications. The resulting difference 1506 (FIG. 14) between the original low-pass subband signal 846 (FIG. 8) and the scaled base-layer frame 921 (FIG. 8) can be compensated by the coded lowpass subband residual signal 310, 315 (FIG. 18).

Figure 2:
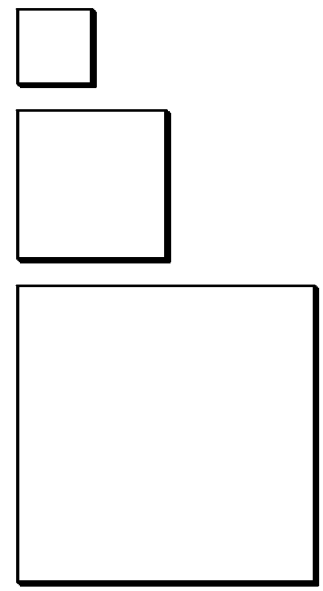
FIG. 2 illustrates the signal representation of a coded image or video frame using a pyramidal coding approach with three resolution levels in accordance with prior art practices.

FIG. 18 can be compared with FIGS. 1 and 2 to observe differences between the coded signals employed by pyramidal coding, subband/wavelet coding, and the proposed scalable coding approach, respectively. FIG. 18 illustrates that the difference between the original low-pass subband signal and the scaled base-layer frame can be compensated by the coded lowpass subband residual signal. The residual coding of the lowpass subbands, as indicated by the dashed regions in the figure, is only optional in the proposed embodiments. The residual coding of the lowpass subbands can be utilized to further reduce the quantization error fed back from the lower layer. The residual coding of the lowpass subbands can be utilized to compensate for difference between the original low-pass subband signal 846 (FIG. 8) and the scaled base-layer frame 921 (FIG. 8) caused by a filter difference between the down sample filter that generates the lower resolution version of the source frame and the low pass analysis filter that generates the subband representation of the current enhancement layer.

In some embodiments, the creation of the versions of the source video frame other than the version of the source video frame having the highest resolution is done by starting with the highest resolution version of the source video frame and recursively creating each next lower resolution source video frame from a current version by performing a cascaded two-dimensional (2-D) separable filtering and down-sampling operation in which a one-dimensional lowpass filter is associated with each version and at least one downsampling filter is different from a lowpass filter of the subband analysis filter banks that generates subband representations for a resolution version of the source frame that is next higher than the lowest resolution. In these embodiments the residual coding of the lowpass subband can be utilized, as described above, to compensate for difference between the original low-pass subband signal 846 (FIG. 7) and the scaled base-layer frame 921 (FIG. 8).

Certain of the methods described above with reference to FIGS. 3-18 have been fully implemented using the JVT JSVM reference software version JSVM 6_8_1. The Intra coding test condition in defined by the JVT core experiment (CE) on inter-layer texture prediction for spatial scalability was adopted for evaluation of the proposed algorithm. The four test sequences BUS, FOOTBALL, FOREMAN, and MOBILE are encoded at a variety of base and enhancement layer QP (quantization parameter) combinations. The CE benchmark results were provided by the CE coordinator using the reference software JSVM 6_3.

Figure 19:
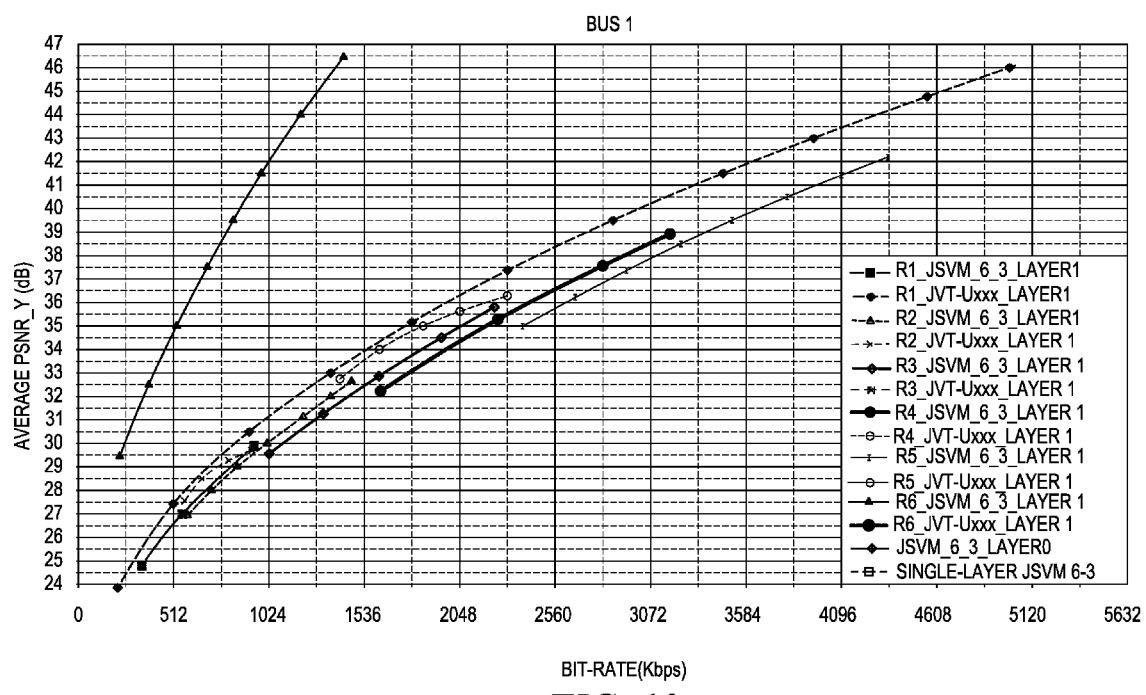
FIGS. 19-21 are graphs of simulations that compare the performance of certain embodiments with performance of prior art systems.

For test results indicated by JVT-Uxxx in FIG. 19, the Daub. 9/7 filters were used for wavelet analysis/synthesis (the same floating wavelet filters adopted by JPEG 2000) of the higher layer frames. The encoder employed the same lowpass filter for dyadic downsampling the input intra-frame. The coding of the entire lowpass subband was skipped. Each curve segment displays the results encoded by the same base QP and four different enhancement QP values. The second test point in each segment happens to correspond to the optimal base and enhancement QP combination in a rate-distortion sense for the given base layer QP. As one can see, the proposed algorithm significantly outperformed the related JSVM results when the enhancement coding rate was not far from the optimal operation point.

Figure 20:
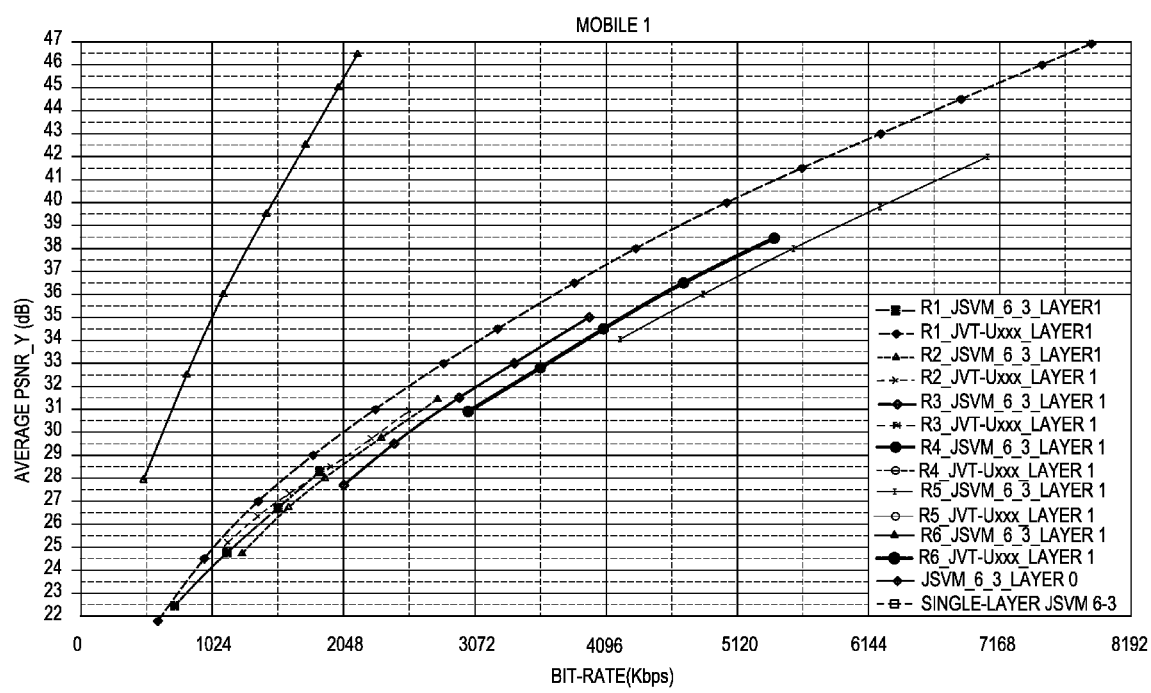

For generating the test results in FIG. 20 the same filter banks settings were used as in the previous experiment but the lowpass subband was encoded for further refinement and correction of lowpass signal. As one can see, the proposed method provided a smooth rate-distortion curve and consistently outperformed the related JSVM results. Most importantly, the resulting enhancement coding performance did not vary much with the base QP value, in a clear contrast to the corresponding JSVM results.

Figure 21:
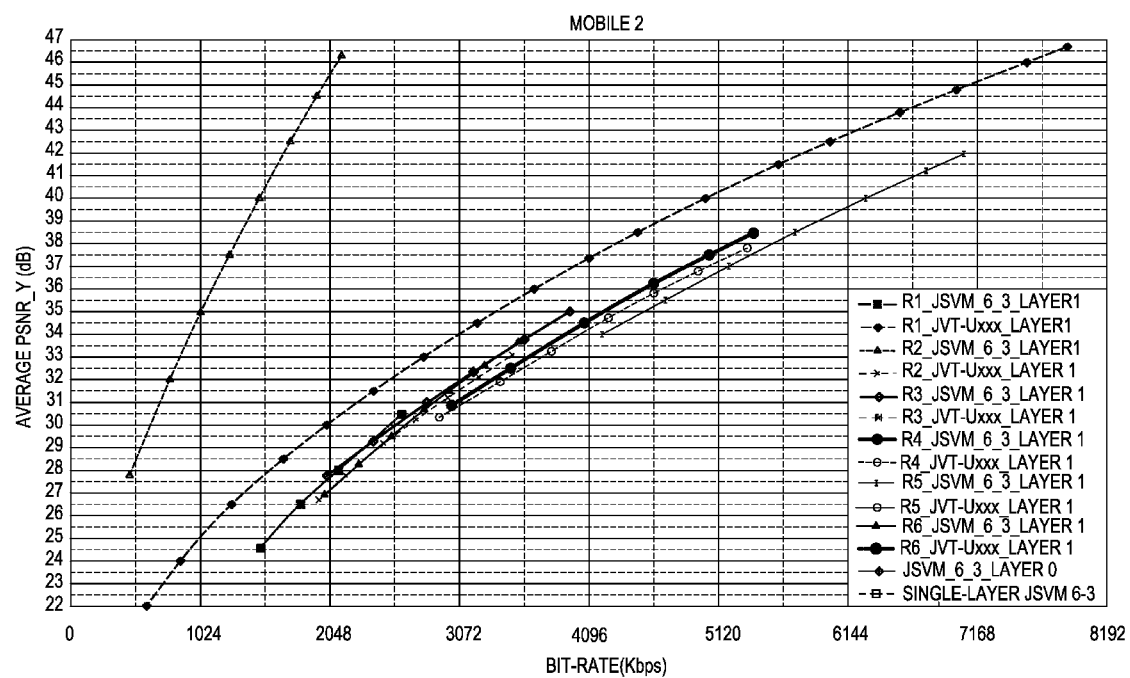

For the test results in FIG. 21, the AVC lowpass filter was employed for generating the low resolution video and coding of the lowpass band image region was not skipped. As one can see the results are almost as good as the related JSVM results. The performance degradation against the related results in FIG. 5 is considered reasonable because the AVC downsampling filter and the lowpass subband filter have very different frequency response characteristics.

B. Quality Scalable Coding & Combined Scalable Coding

The proposed subband/wavelet intraframe video coding framework detailed previously can be further extended for quality/bitrate scalable video coding applications. The quality scalable bitstream, consisting of a base layer bitstream and one or multiple enhancement layer bitstreams, is particularly useful for providing video services over a heterogeneous networking environment at different coding bitrates. The coding bitrate of compressed video signal can be flexibly adapted to the constraint of transmission bandwidth by dropping the bitstream units, or packets, of the quality enhancement layers.

In one embodiment, the base quality layer in the proposed quality scalable coding system further comprises multiple resolution scalable layers, representing the subband/wavelet transformed input video frame according to the proposed spatial scalable coding method described in Section A. In this way, the base quality layer can be encoded in a subband representation while maintaining a base layer compatible to the conventional nonscalable coding at reduced resolution. The individual quality enhancement layers can also be represented by subband/wavelet coefficients and are encodable by the conventional inter-layer frame texture encoder described above. Therein, the inter-layer prediction signal is formed from a coarsely coded subband representation of the next lower quality layer.

Figure 22:
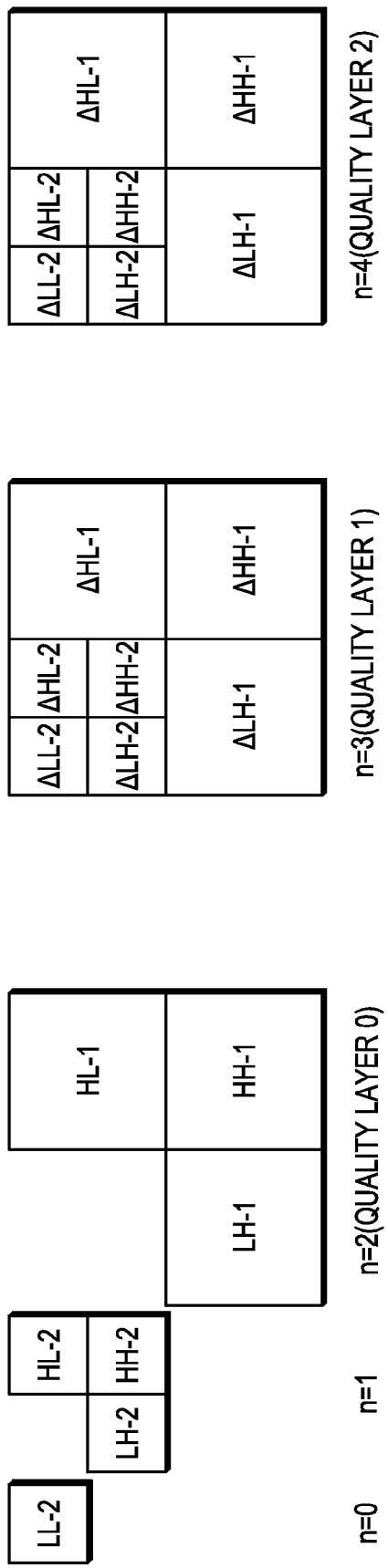
FIG. 22 illustrates the signal representation of a coded image or video frame using the proposed quality scalable subband/wavelet coding method in three quality layers and two subband decomposition levels, in accordance with certain embodiments.

This method is further illustrated in FIG. 22 for scalable coding in three quality layers and two levels of subband decomposition according to certain embodiments. As shown, the base quality layer contains three resolution scalable layers, each for representing subband coefficients from the same resolution scale at a coarse quality level. Each quality enhancement further encodes the coding error from the previous layer with finer quantization stepsize, allowing an incremental refinement of the coarsely coded subbands. In this way, the coded video can be recovered at three different quality levels from a single scalable bitstream, depending on the number of the enhancement layers eventually included in the final received bitstream.

Figure 23:
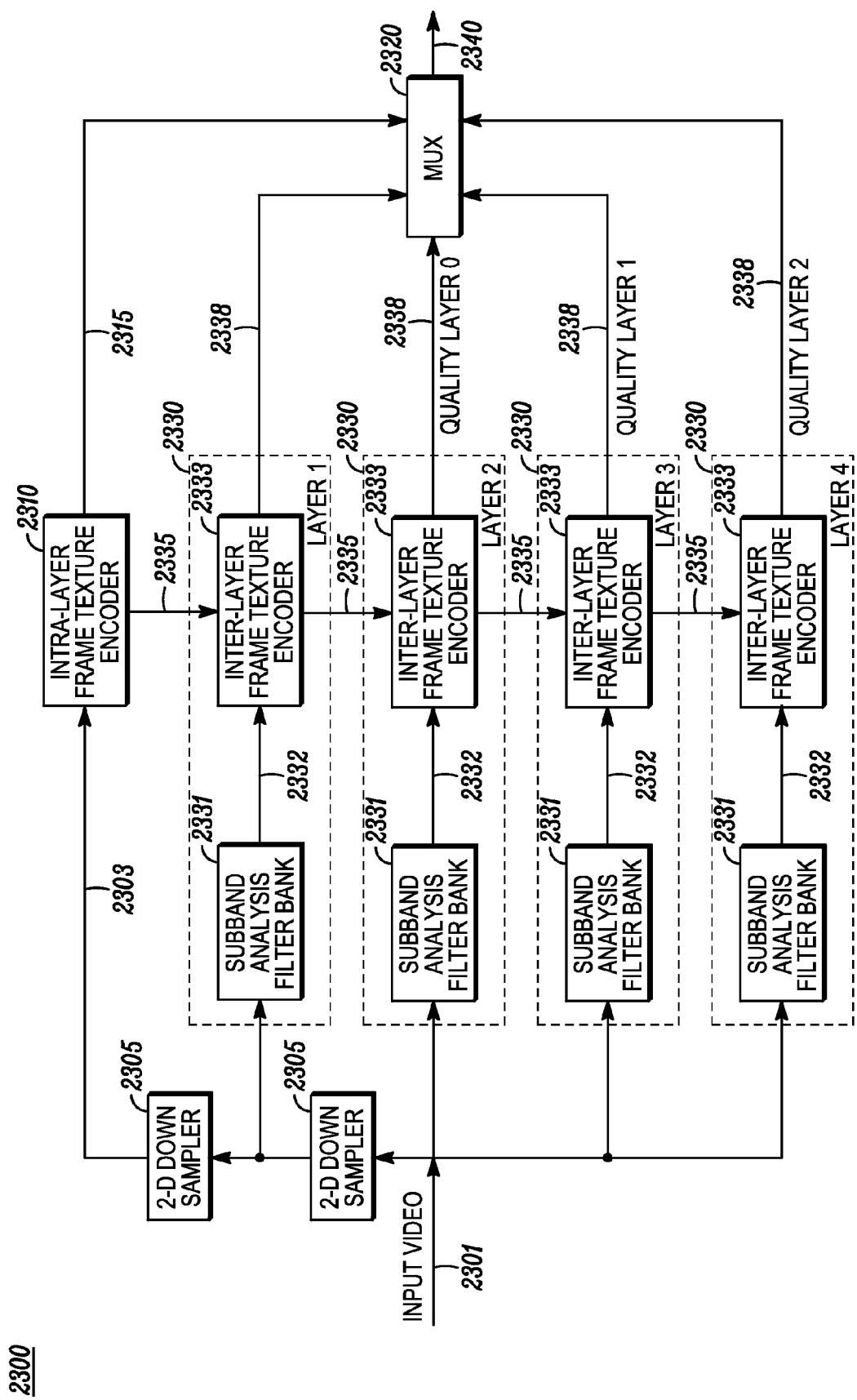
FIG. 23 shows a block diagram of a proposed quality scalable encoding system for certain embodiments having three quality scalable layers and three resolution levels in accordance with certain embodiments.

Referring to FIG. 23, a block diagram shows an exemplary embodiment of quality scalable encoding system 2300, according to the layered scalable coding structure shown in FIG. 22. Generally, the overall system consists of a base quality layer and two quality enhancement layers for creating a quality scalable bitstream for decoding at three different video quality levels. The base quality layer further comprises three resolution scalable layers and is encoded by the spatial scalable coding method, as previously shown in FIG. 5 in two layers. The input video frame is first processed by a 2-D down-sampler 2305 to generate a version of the input video frame at reduced resolution in each spatial dimension and the output low resolution frame is further 2-D down-sampled to generate a lowest resolution version 2303 of input video frame. The lowest resolution version 2303 is processed by a base layer encoder that comprises an intra-layer frame texture encoder 2310. The intra-layer frame texture encoder 2310 generates a base layer bitstream 2315 as an output that is coupled to a multiplexer 2320. At each enhancement layer 2330 (indicated by the dashed block), the subband analysis filter banks 2331 take the related version of the input video frame and generate subband (wavelet) coefficients. The inter-layer frame texture encoder 2333 utilizes information 2335 from the previous layer for removing interlayer redundancies and generates an enhancement layer bitstream 2338 as an output for representing the coded input subband representation 2332. The enhancement layer bitstream 2338 is also coupled to the multiplexer 2320. The multiplexer 2320 multiplexes the base layer bitstream 2315 and the enhancement layer bitstreams 2338 to generate a scalable bitstream 2340 that conveys the encoded information needed to recover the coded video at different resolution and quality levels. It will be appreciated that in an embodiment having more enhancement layers, the same enhancement layer coding method can be applied. That is, the subband analysis filter banks of each enhancement layer encoder are employed to generate a subband representation for a particular resolution version of a source video frame and the resulting subband coefficients of the representations are encoded by the inter-layer texture frame encoder at each enhancement layer utilizing the information provided by the previous layer. The embodiment shown in FIG. 23 utilizes similar components as these shown in FIG. 5, but is particularly adapted for application to quality scalable coding and combined scalable coding. The operation of these system components is described in Section A.

Referring to FIG. 24, a flow chart 2400 shows some steps of a quality scalable video encoding method for compressing a source video frame, in accordance with certain embodiments, based at least in part on the descriptions above with reference to FIGS. 22 and 23. At step 2405, a base quality layer bitstream is generated by encoding the source video frame at a specified lowest quality level or encoding bitrate. A set of enhancement layer bitstreams is generated at step 2410 by encoding the source video frame at a set of the increasing quality levels or encoding bitrates. There may be as few as one enhancement layer bitstream in the set. For each enhancement, the encoding comprises 1) decomposing the source video frame by subband analysis filter banks into a subband representation of the source video frame; 2) forming an inter-layer prediction signal which is a representation of a recovered video frame of the next lower quality layer; and 3) generating the enhancement layer bitstream by encoding the subband representation by an inter-layer frame texture encoder that further utilizes the inter-layer prediction signal to remove inter-layer redundancy. A scalable bitstream is composed at step 2415 from the base layer bitstream and the set of enhancement layer bitstreams using a bitstream multiplexer.

Referring to FIG. 25, a flow chart 2500 shows some steps of a quality scalable video decoding method for decompressing a coded video frame, in accordance with certain embodiments, based at least in part on the descriptions above with reference to FIGS. 22 and 23. At step 2505, the packets containing the related coded coefficients to a requested resolution and/or quality level are extracted from a scalable bitstream using a bitstream parser. At step 2510, a base quality version of the decoded video frame is recovered from the extracted packets of the base quality layer bitstream. At step 2515, a set of decoded subband representations of increasing quality level is recovered, wherein each decoded subband representation in the set is recovered by decoding the extracted packets of the corresponding one of the set of enhancement layer bitstreams, For each enhancement layer bitstream, the decoding comprises 1) forming an inter-layer prediction signal which is a representation of a recovered video frame of the next lower quality layer; and 2) recovering the subband representation by decoding the extracted packets of the corresponding enhancement layer by an inter-layer frame texture decoder that further utilizes the inter-layer prediction signal to remove inter-layer redundancy. At step 2520, the decoded video frame is synthesized from the decoded subband representation at the final enhancement layer using subband synthesis filter banks. At step 2525, a clipping operation may be performed on the decoded frame according to the pixel value range adopted for the pixel representation.

Because the quality enhancement layers represented by subbands as illustrated in FIG. 22 are inherently resolution scalable, the previously described method can be further applied to combined scalable coding. In this case, the subband/wavelet coefficients can be further grouped according to subband partition or resolution scale and then encoded into separate bitstream packets. For example, in a preferred embodiment, built upon H.264/AVC coding tools, the subband macroblocks can be partitioned by a slice group map conforming to the subband decomposition structure and represented by separate NAL units. In this way, the coded subbands contributing to the specified resolution levels of interest can be easily extracted from the related NAL units and the resulting quality scalable bitstream is further resolution scalable. We can accommodate additional spatial scalability with almost no performance penalty and thus is able to efficiently achieve scalable decoding at a wide variety of bitrate and resolution selections through a single scalable bitstream, in a clear contrast to the conventional layered DPCM-based intraframe video coding system which can generally only provide a small number of the different scalable decoding bitrate/resolution options.

In more detail, in the embodiment built on the MPEG-4 AVC/H.264 coding tools, the proposed subband/wavelet coding system can operate on a classical wavelet critical sampling setting. The resulting system then has the same total number of samples for processing/coding as that of the source samples and performs just like a conventional single-layer coder without any compression and complexity overhead. It is also worth mentioning that a subband in such a system is actually encoded by transform coding when the inter-layer prediction mode, I_BL, is exclusively selected for every macroblock within the subband region. It is because the I_BL macroblock coding only performs refinement of coded samples, not involving spatial prediction from the adjacent coded samples. One can thus choose to have all subbands, except for the lowest-frequency subband at the MPEG-4 AVC/AVC compatible base layer, coded by a transform coding approach. In this way, by re-use of the existing MPEG-4 AVC/H.264 coding tools to work with the added subband filter banks, one can provide the MPEG-4 AVC/H.264 standard with a new intraframe coding method that is primarily based on the alternative transform coding paradigm with additional spatial scalability and other desirable benefits and useful for both scalable and conventional single-layer intraframe coding applications. In addition, this new intracoding method does not incur the costs of conventional spatial scalable coding and is free from drift, error propagation, and the complex mode selection process associated with the current MPEG-4 AVC/H.264 intraframe hybrid coding.

In the quality scalable encoding system 2300 embodied in FIG. 23, in its simplest form, it can include: a base quality layer encoder for generating a base quality layer bitstream by encoding a source video frame at a specified lowest quality level or encoding bitrate; an enhancement layer encoder for generating a set of enhancement layer bitstreams at a set of the increasing quality level or encoding bitrate, the enhancement layer encoder comprising subband analysis filter banks for decomposing the source video frame by subband analysis filter banks into a subband representation of the source video frame, and an inter-layer frame texture encoder for generating the enhancement layer bitstream by encoding the subband representation using an inter-layer prediction signal, the inter-layer frame texture encoder further comprising an inter-layer predictor for forming the inter-layer prediction signal which is a representation of a recovered video frame of the next lower quality layer; and a bitstream multiplexer for composing a scalable bitstream from the base quality layer bitstream and enhancement layer bitstreams. This system 2300 is particularly adapted for efficiently accommodating quality scalability and combined scalability.

The method can be used for compressing an image, a video frame and the like.

In one arrangement, the filters in the subband analysis filter banks belong to one of a family of wavelet filters and a family of quadrature mirror filter (QMF). This provides efficient filter sets for image video compression applications.

In another embodiment, the inter-layer frame texture encoder comprises a block transform encoder. For example, in an embodiment, the subband representation can be sequentially partitioned into a plurality of block subband representations for non-overlapped blocks, further comprising encoding the block subband representation for each non-overlapped block by the inter-layer frame texture encoder and encoding the block subband representation further comprises: forming a spatial prediction signal from recovered neighboring subband coefficients; selecting a prediction signal between the inter-layer prediction signal and the spatial prediction signal for each block adaptively; and encoding, by the transform block encoder, a prediction error signal that is a difference of the block subband representation and the selected prediction signal for each block. In this arrangement, this can allow use of a conventional video block coding tool, for compressing subband coefficients, in quality scalable coding applications, for example.

In one embodiment, the inter-layer frame texture encoder comprises an enhancement-layer intraframe coder defined in the scalable video extension to the MPEG-4 Part 10 AVC/H.264 standard and the macroblock modes are selected to be I_BL for all macroblocks. Advantageously, this embodiment is compatible with the MPEG-4 Part 10 AVC/H.264. In certain alternative embodiments, the method can be further applied to other earlier scalable video coding standards that are based on a conventional layered DPCM DCT framework such as MPEG-2, 4 and the version 2 of H.263. As should be understood, it can have application outside this particular standard as well. Thus, in one embodiment, minimal or no modifications would be required to be compatible with the standard.

In one arrangement, the inter-layer frame texture encoder comprises an intra-layer frame texture encoder that encodes a residual signal that is a difference between the subband representation and the inter-layer prediction signal. In this arrangement, this embodiment could be implemented by a single layer coding scheme, as commonly used in the market.

In one embodiment, the enhancement-layer bitstreams contain a syntax element indicating the number of the decomposition levels of each enhancement layer and thus the number of the subband levels can be individually optimized for each enhancement layer frame for best coding performance.

In one embodiment, each quality bitstream layer further comprises one or more than one resolution scalable layers. Advantageously, this can provide an alternative bit stream arrangement for encoding a quality scalable layer useful in certain applications. In more detail, the quality bitstream can correspond to a low resolution layer of the base quality layer and can be substantially compatible with one of the standards MPEG-1, MPEG-2, MPEG-4, and H.264/AVC.

Also in one embodiment, the blocks of the subband coefficients are further grouped according to a slice group map, as defined in H.264/AVC, that further conforms to the subband partition or resolution scale of the subband representation and different groups of coefficients are encoded into different bitstream packets. This embodiment can be useful for applications in various standards.

As shown in FIG. 25, a quality scalable video decoding method for decompressing a coded video frame into a decoded video frame, comprising: extracting packets related to a requested resolution and/or quality level from a scalable bit stream using a bitstream parser; recovering a base quality version of the decoded video frame from the extracted packets of the base quality layer bitstream; recovering a set of decoded subband representations of increasing quality level, wherein each decoded subband representation in the set is recovered by decoding the extracted packets of the corresponding one of the set of enhancement layer bitstreams, comprising for each enhancement layer bitstream forming an inter-layer prediction signal which is a representation of a recovered video frame of the next lower quality layer, and recovering the subband representation by decoding the enhancement layer by an inter-layer frame texture decoder that utilizes the inter-layer prediction signal to remove inter-layer redundancy; and synthesizing the decoded video frame from the decoded subband representation at the final enhancement layer using subband synthesis filter banks; and performing a clipping operation on the synthesized video frame according to the pixel value range. This method has use in relevant standards.

In one embodiment, the method can further comprise a bitstream parser that accepts a scalable bitstream as input and generates an output bitstream by removing the packets of high frequency subbands unrelated to the requested resolution for decoded video, wherein the input scalable bitstream includes packets for representing coded subband coefficients grouped according to a sliced group map, as defined in H.264/AVC, that further conforms to the subband partition or resolution scale of the subband representation. This method has application in relevant standards as well as nonstandard applications.

A bitstream parser, according to certain embodiments, accepts a scalable bitstream as input and generates an output bitstream by removing the packets of high frequency subbands unrelated to the requested resolution for decoded video, wherein the input scalable bitstream includes packets for representing coded subband coefficients grouped according to a sliced group map, as defined in H.264/AVC, that further conforms to the subband partition or resolution scale of the subband representation.

Figure 26:
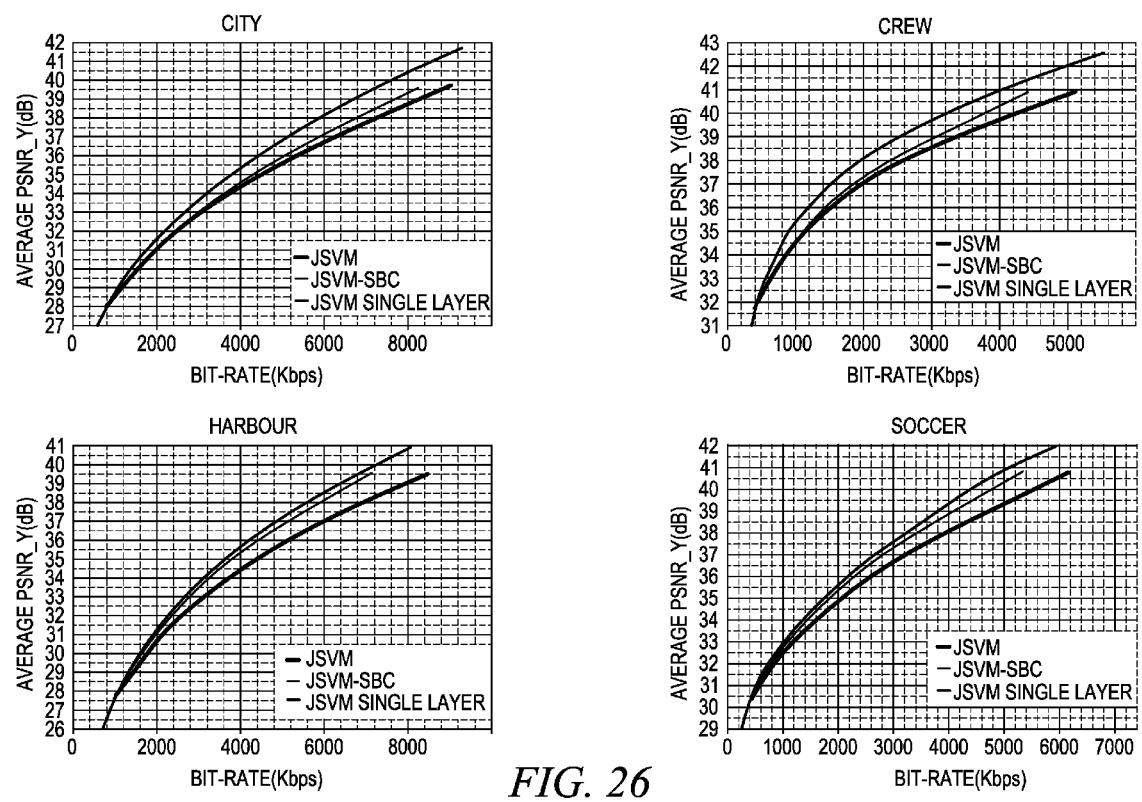
FIGS. 26 and 27 are graphs of simulations that compare the performance of certain embodiments with performance of prior art systems.
Figure 27:
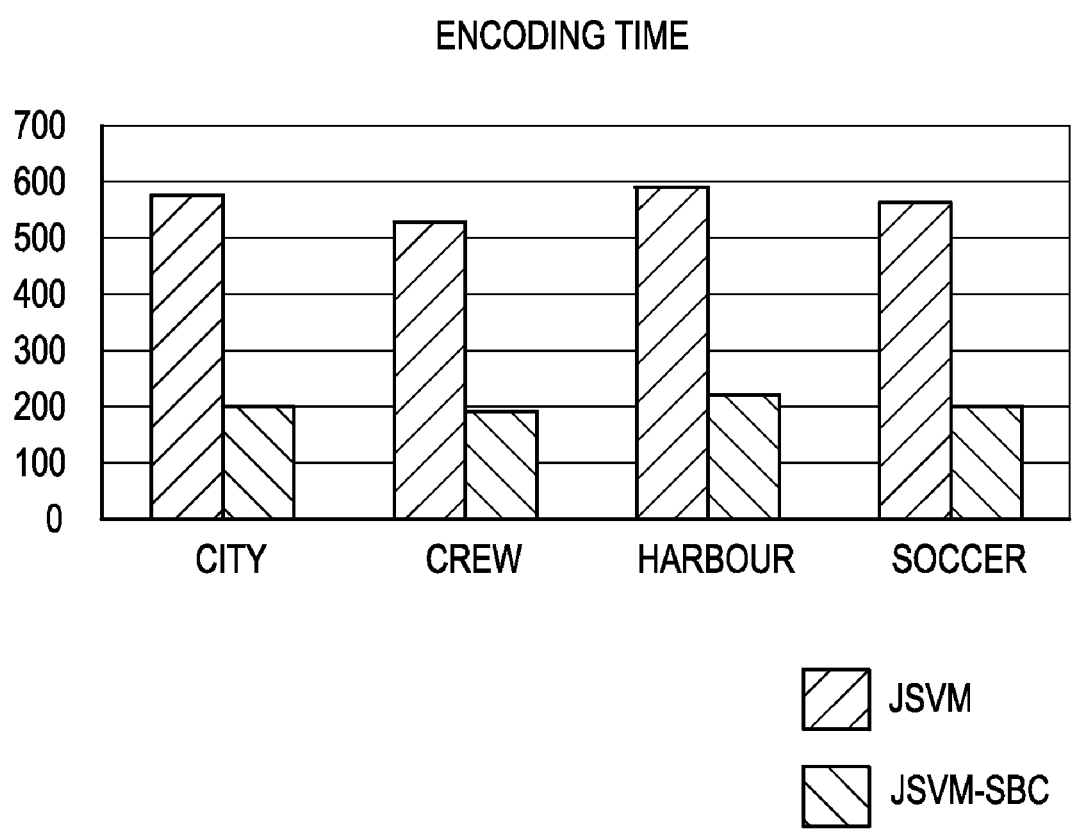

Turning now to the simulation results shown in FIGS. 26 and 27, certain of the methods described above with reference to FIGS. 22-25 have been fully implemented based on the SVC reference software JSVM version 9 (CVS tag JSVM_8_9). The CDF (Daubechies) 9/7 synthesis filter banks have been adopted by the proposed decoder for synthesizing the coded subband representation. All subbands at the enhancement layers were exclusively coded using the I_BL macroblock mode. The modified JSVM software based on the proposed algorithm was evaluated against the original JSVM software through extensive coding experiments. The source test sequences CITY, CREW, HARBOUR and SOCCER at 4CIF resolution were adopted for simulation. Each test sequence contained 150 frames and was intra-coded at 15 frames per second (fps). The same setting of configuration files and encoder options was employed for generating the results of the original JSVM and the modified JSVM. In addition, we also provide the related results of single-layer coding using the same JSVM software with the encoder option "FRExt" enabled (the 8×8 intra predictor set and 8×8

DCT transform enabled), corresponding to H.264/AVC intraframe coding at the high profile without using scaling matrices.

FIG. 26 compares the PSNR results of the proposed JSVM-SBC and the reference JSVM for SNR scalable coding 4CIF sequences in four layers. The results of JSVM-SBC and JSVM were generated using the CABAC entropy coding mode with the encoder option "FRExt" enabled for all layers. The transform coefficients are quantized by a fixed QP at each CGS layer with the QP value set equal to 42, 36, 30, and 24 from layers 0 to 3, respectively. For further comparison with conventional nonscalable coding, we also provided the related results of JSVM single-layer coding, indicated by "JSVM Single layer" in the figure. As shown in FIG. 26, the proposed algorithm based on a transform coding approach outperforms the original JSVM for all test results and the improvements increase with the layer number. For coding sequences HARBOUR and SOCCER, the PSNR results of the proposed JSVM-SBC are actually very close to the corresponding single-layer results.

FIG. 27 further compares the encoding speed performance of the proposed algorithm and the reference JSVM for CGS coding in four layers using CABAC, where the encoding times were measured on a Windows mobile workstation with 2.0 GHz Intel Pentium M processor and 1.0 GB of RAM. As illustrated, the JSVM encoder, involving the complex process of intra prediction mode decision, is much slower than the proposed subband encoder. It should be noted that this experiment was only intended to illustrate the speed advantage of the proposed algorithm. The same JSVM software base employed for implementation of both methods was not optimized for speed performance.

It will be appreciated that embodiments of the invention described herein may be comprised of one or more conventional processors and unique stored program instructions that control the one or more processors to implement, in conjunction with certain non-processor circuits, some, most, or all of the functions of the embodiments of the invention described herein. As such, these functions may be interpreted as steps of a method to perform video compression and decompression. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for these functions have been described herein. In those situations for which functions of the embodiments of the invention can be implemented using a processor and stored program instructions, it will be appreciated that one means for implementing such functions is the media that stores the stored program instructions, be it magnetic storage or a signal conveying a file. Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the dependency of this application and all equivalents of those claims as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A quality scalable video encoding method for compressing a source video frame, comprising:
   generating a base quality layer bitstream by encoding the source video frame at a specified lowest quality level or encoding bitrate;
   generating a set of enhancement layer bitstreams by encoding the source video frame at a set of the increasing quality levels or encoding bitrates, the encoding including:
      decomposing the source video frame by subband analysis filter banks into a subband representation of the source video frame;
      forming an inter-layer prediction signal which is a representation of a recovered video frame of the next lower quality layer; and
      generating the enhancement layer bitstream by encoding the subband representation by an inter-layer frame texture encoder that further utilizes the inter-layer prediction signal to remove inter-layer redundancy; and
   composing a scalable bitstream from the base quality layer bitstream and the set of enhancement layer bitstreams using a bitstream multiplexer.

2. The method according to claim 1, wherein the inter-layer frame texture encoder comprises a block transform encoder.

3. The method according to claim 2, wherein the subband representation is sequentially partitioned into a plurality of block subband representations for non-overlapped blocks, further comprising encoding the block subband representation for each non-overlapped block by the inter-layer frame texture encoder and encoding the block subband representation further comprises:
   forming a spatial prediction signal from recovered neighboring subband coefficients;
   selecting a prediction signal between the inter-layer prediction signal and the spatial prediction signal for each block adaptively; and
   encoding, by the transform block encoder, a prediction error signal that is a difference of the block subband representation and the selected prediction signal for each block.

4. The method according to claim 3, wherein the inter-layer frame texture encoder comprises an enhancement-layer intraframe encoder conforming to the scalable video coding extension to the MPEG-4 Part 10 AVC/H.264 standard but without a clipping operation performed on the decoded signal.

5. The method according to claim 1, wherein the inter-layer frame texture encoder comprises an intra-layer frame texture encoder that encodes a residual signal that is a difference between the subband representation and the inter-layer prediction signal.

6. The method according to claim 1, wherein the enhancement-layer bitstreams contain a syntax element indicating the number of the decomposition levels of each enhancement layer.

7. The method according to claim 1, wherein the base quality layer further comprises one or more than one scalable layers for representing the source video frame at the reduced or same resolution.

8. The method according to claim 7, wherein the first scalable layer of the base quality layer is compatible with one of the standards MPEG-1, MPEG-2, MPEG-4, and H.264/AVC.

9. The method according to claim 3, wherein blocks of the subband coefficients are further grouped according to a slice group map, as defined in H.264/AVC, that further conforms to the subband partition or resolution scale of the subband representation and different groups of coefficient blocks are encoded into different bitstream packets.

10. A quality scalable video decoding method for decompressing a coded video frame into a decoded video frame, comprising:
    extracting the packets containing the related coded coefficients to a requested resolution and/or quality level from a scalable bitstream using a bitstream parser;
    recovering a base quality version of the decoded video frame from the extracted packets of the base quality layer bitstream;
    recovering a set of decoded subband representations of increasing quality level, wherein each decoded subband representation in the set is recovered by decoding the extracted packets of the corresponding one of the set of enhancement layer bitstreams, comprising for each enhancement layer bitstream
        forming an inter-layer prediction signal which is a representation of a recovered video frame of the next lower quality layer, and
        recovering the subband representation by decoding the extracted packets of the corresponding enhancement layer by an inter-layer frame texture decoder that further utilizes the inter-layer prediction signal to remove inter-layer redundancy;
    synthesizing the decoded video frame from the decoded subband representation at the final enhancement layer using subband synthesis filter banks; and
    performing a clipping operation on the synthesized video frame according to the pixel value range.

11. The method according to claim 10, wherein the inter-layer frame texture decoder comprises a block transform decoder.

12. The method according to claim 11, wherein the decoded subband representation is sequentially partitioned into a plurality of decoded block subbands for non-overlapped blocks, further comprising generating the decoded block subband representation for each non-overlapped block by the inter-layer frame texture decoder and generating the decoded block subband representation further comprises:
    forming a spatial prediction signal from recovered neighboring subband coefficients;
    selecting a prediction signal between the inter-layer prediction signal and the spatial prediction signal for each block adaptively; and
    decoding, by the transform block decoder, a prediction error signal that is a difference of the decoded block subband representation and the selected prediction signal for each block.

13. The method according to claim 12, wherein the set of enhancement layer bitstreams is compatible with the scalable video coding extension to the MPEG-4 Part 10 AVC/H.264 standard.

14. The method according to claim 12, wherein the inter-layer frame texture decoder comprises an enhancement layer intra-frame decoder described in one of the standards MPEG-4 Part 10 AVC/H.264, MPEG-2, MPEG-4, and the version.2 of H.263 but without a clipping operation performed on the decoded signal in the intra-frame decoder.

15. The method according to claim 12, wherein the method further comprises a bitstream parser that generates an output bitstream by removing the packets of high frequency subbands unrelated to the requested resolution for decoded video from the input scalable bitstream comprising packets for representing coded subband coefficients grouped according to a sliced group map, as defined in H.264/AVC, that further conforms to the subband partition or resolution scale of the subband representation.

16. A quality scalable encoding system for compressing a source video frame, comprising:
    a base quality layer encoder for generating a base quality layer bitstream by encoding the source video frame at a specified lowest quality level or encoding bitrate;
    an enhancement layer encoder for generating a set of enhancement layer bitstreams at a set of the increasing quality level or encoding bitrate, the enhancement layer encoder comprising
        subband analysis filter banks for decomposing the source video frame by subband analysis filter banks into a subband representation of the source video frame, and
        an inter-layer frame texture encoder for generating the enhancement layer bitstream by encoding the subband representation utilizing an inter-layer prediction signal, the inter-layer frame texture encoder further comprising an inter-layer predictor for forming the inter-layer prediction signal which is a representation of a recovered video frame of the next lower quality layer; and
    a bitstream multiplexer for composing a scalable bitstream from the base quality layer bitstream and enhancement layer bitstreams.

17. The system according to claim 16, wherein the inter-layer frame texture encoder comprises a block transform encoder.

18. An quality scalable decoding system for decompressing a coded video frame from a scalable bitstream, comprising:
    a bitstream parser for extracting packets related to a requested resolution and/or quality level from a scalable bit stream using a bitstream parser
    a base layer decoder for decoding a base quality version of the extracted packets of the base quality layer bitstream;

an enhancement layer decoder for recovering a set of decoded subband representations of increasing quality level, wherein each decoded subband representation in the set is recovered by decoding the extracted packets of the corresponding one of the set of enhancement layer bitstreams, the enhancement layer decoder comprising an inter-layer frame texture decoder for decoding a subband representation utilizing an inter-layer prediction signal, the inter-layer frame texture decoder further comprising an inter-layer predictor for forming an inter-layer prediction signal which is a representation of a recovered video frame of the next lower quality layer;

synthesis filter banks for synthesizing the decoded frame from the decoded subband representation at the final enhancement layer; and a delimiter that performs a clipping operation on the synthesized video frame according to the pixel value range.

19. The system according to claim 18, wherein the inter-layer frame texture decoder comprises a block transform decoder.

* * * * *